US010762747B2

(12) United States Patent
Brown

(10) Patent No.: US 10,762,747 B2
(45) Date of Patent: Sep. 1, 2020

(54) GAMING SYSTEM AND METHOD PROVIDING A KENO GAME INCLUDING BONUS TILES

(71) Applicant: IGT, Las Vegas, NV (US)

(72) Inventor: Bradford Brown, Sparks, NV (US)

(73) Assignee: IGT, Las Vegas, NV (US)

( * ) Notice: Subject to any disclaimer, the term of this patent is extended or adjusted under 35 U.S.C. 154(b) by 244 days.

(21) Appl. No.: 15/847,072

(22) Filed: Dec. 19, 2017

(65) Prior Publication Data

US 2019/0188965 A1 Jun. 20, 2019

(51) Int. Cl.
*A63F 13/00* (2014.01)
*G07F 17/32* (2006.01)

(52) U.S. Cl.
CPC ...... *G07F 17/3262* (2013.01); *G07F 17/3211* (2013.01); *G07F 17/3244* (2013.01); *G07F 17/3286* (2013.01)

(58) Field of Classification Search
CPC ............. A63F 3/06; A63F 3/08; A63F 3/0605
See application file for complete search history.

(56) References Cited

U.S. PATENT DOCUMENTS 4,033,588 A 7/1977 Watts et al.
4,611,811 A 9/1986 Haase et al.
4,661,906 A 4/1987 Difrancesco et al.
4,711,454 A 12/1987 Small
4,747,600 A 5/1988 Richardson et al.
4,775,155 A 10/1988 Lees
4,798,387 A 1/1989 Richardson
4,875,686 A 10/1989 Timms
5,005,840 A 4/1991 Schwartz et al.
5,043,887 A 8/1991 Richardson et al.
5,046,737 A 9/1991 Feinberg
5,072,381 A 12/1991 Richardson et al.
5,100,139 A 3/1992 Di Bella
5,116,049 A 5/1992 Sludikoff et al.
5,158,293 A 10/1992 Mullins
5,280,909 A 1/1994 Tracy et al.
5,351,970 A 10/1994 Fioretti et al.
5,364,104 A 11/1994 Jones et al.
5,377,973 A 1/1995 Jones et al.
5,401,024 A 3/1995 Simunek
5,419,592 A 5/1995 Stuart
(Continued)

*Primary Examiner* — Omkar A Deodhar
*Assistant Examiner* — Eric M Thomas
(74) *Attorney, Agent, or Firm* — Neal, Gerber & Eisenberg LLP

(57) ABSTRACT

The present disclosure is directed to a gaming system and method providing a keno game including bonus tiles. The method includes, in response to a determination that a quantity of bonus draws for a first keno board is greater than zero bonus draw, causing a display device to display at least one bonus tile with the first keno board, for each bonus tile displayed with the first keno board, adding a bonus keno number to the set of different keno numbers, selecting a quantity of keno numbers from the set of different keno numbers based on in part the quantity of bonus draws, adding the selected keno numbers to a gaming system keno number set, and determining any bonus awards based on a comparison of the keno numbers included in the gaming system keno number set and the bonus keno numbers that map to any of the displayed bonus tiles.

20 Claims, 18 Drawing Sheets

(56) References Cited

U.S. PATENT DOCUMENTS

| | | | |
|---|---|---|---|
| 5,482,289 | A | 1/1996 | Weingardt et al. |
| 5,569,083 | A | 10/1996 | Fioretti et al. |
| 5,586,937 | A | 12/1996 | Menashe |
| 5,639,089 | A | 6/1997 | Matsumoto et al. |
| 5,647,798 | A | 7/1997 | Falciglia |
| 5,651,735 | A | 7/1997 | Baba |
| 5,679,077 | A | 10/1997 | Pocock et al. |
| 5,687,971 | A | 11/1997 | Khaladkar |
| 5,718,631 | A | 2/1998 | Invencion et al. |
| 5,727,786 | A | 3/1998 | Weingardt et al. |
| 5,743,526 | A | 4/1998 | Inoue |
| 5,755,619 | A | 5/1998 | Matsumoto et al. |
| 5,766,076 | A | 6/1998 | Pease et al. |
| 5,779,545 | A | 7/1998 | Berg et al. |
| 5,823,534 | A | 10/1998 | Banyai et al. |
| 5,833,537 | A | 11/1998 | Barrie |
| 5,855,515 | A | 1/1999 | Pease et al. |
| 5,857,911 | A | 1/1999 | Fioretti et al. |
| 5,871,398 | A | 2/1999 | Schneier et al. |
| 5,885,158 | A | 3/1999 | Torango et al. |
| 5,909,875 | A | 6/1999 | Weingardt et al. |
| 5,935,001 | A | 8/1999 | Baba et al. |
| 5,935,002 | A | 8/1999 | Falciglia |
| 5,945,655 | A | 8/1999 | Gilgeous et al. |
| 5,947,820 | A | 9/1999 | Morro et al. |
| 6,017,032 | A | 1/2000 | Grippo et al. |
| 6,024,640 | A | 2/2000 | Walker et al. |
| 6,079,711 | A | 6/2000 | Wei et al. |
| 6,099,407 | A | 8/2000 | Parker et al. |
| 6,102,400 | A | 8/2000 | Scott et al. |
| 6,146,272 | A | 11/2000 | Walker et al. |
| 6,146,273 | A | 11/2000 | Olsen et al. |
| 6,168,521 | B1 | 1/2001 | Luciano et al. |
| 6,183,361 | B1 | 2/2001 | Cummings et al. |
| 6,210,275 | B1 | 4/2001 | Olsen |
| 6,210,276 | B1 | 4/2001 | Mullins |
| 6,220,961 | B1 | 4/2001 | Keane et al. |
| 6,241,606 | B1 | 6/2001 | Riendeau et al. |
| 6,250,685 | B1 | 6/2001 | Walker et al. |
| 6,257,980 | B1 | 7/2001 | Santini, Jr. |
| 6,315,290 | B1 | 11/2001 | Roethel et al. |
| 6,315,291 | B1 | 11/2001 | Moody |
| 6,325,716 | B1 | 12/2001 | Walker et al. |
| 6,358,151 | B1 | 3/2002 | Enzminger et al. |
| 6,364,313 | B1 | 4/2002 | Moody |
| 6,368,212 | B1 | 4/2002 | Moody |
| 6,368,213 | B1 | 4/2002 | McNabola |
| 6,368,214 | B1 | 4/2002 | Luciano |
| 6,398,644 | B1 | 6/2002 | Perrie et al. |
| 6,398,646 | B1 | 6/2002 | Wei et al. |
| 6,402,614 | B1 | 6/2002 | Schneier et al. |
| 6,425,823 | B1 | 7/2002 | Byrne |
| 6,478,677 | B1 | 11/2002 | Moody |
| 6,482,088 | B2 | 11/2002 | Santini, Jr. |
| 6,514,144 | B2 | 2/2003 | Riendeau et al. |
| 6,524,184 | B1 | 2/2003 | Lind et al. |
| 6,524,185 | B2 | 2/2003 | Lind |
| 6,533,660 | B2 | 3/2003 | Seelig et al. |
| 6,565,091 | B2 | 5/2003 | Weingardt |
| 6,569,017 | B2 | 5/2003 | Enzminger et al. |
| 6,581,935 | B1 | 6/2003 | Odom |
| 6,585,590 | B2 | 7/2003 | Malone |
| 6,599,188 | B2 | 7/2003 | Hirsch et al. |
| 6,599,193 | B2 | 7/2003 | Baerlocher et al. |
| 6,607,440 | B2 | 8/2003 | Santini, Jr. |
| 6,609,973 | B1 | 8/2003 | Weiss |
| 6,645,072 | B1 | 11/2003 | Kellen |
| 6,656,044 | B1 | 12/2003 | Lewis |
| 6,656,045 | B2 | 12/2003 | Wei et al. |
| 6,685,567 | B2 | 2/2004 | Cockerille et al. |
| 6,722,655 | B1 | 4/2004 | Camero |
| 6,726,563 | B1 | 4/2004 | Baerlocher et al. |
| 6,755,738 | B2 | 6/2004 | Glasson et al. |
| 6,755,739 | B2 | 6/2004 | Santini, Jr. |
| 6,758,747 | B2 | 7/2004 | Baerlocher |
| 6,780,108 | B1 | 8/2004 | Luciano, Jr. et al. |
| 6,796,899 | B2 | 9/2004 | Baerlocher |
| 6,802,776 | B2 | 10/2004 | Lind et al. |
| 6,824,465 | B2 | 11/2004 | Luciano, Jr. |
| 6,832,956 | B1 | 12/2004 | Boyd et al. |
| 6,840,858 | B2 | 1/2005 | Adams |
| 7,258,608 | B2 | 8/2007 | Khal |
| 7,297,059 | B2 | 11/2007 | Vancura et al. |
| 7,303,469 | B2 | 12/2007 | Kaminkow |
| 7,306,519 | B2 | 12/2007 | Baerlocher |
| 7,357,716 | B2 | 4/2008 | Marks et al. |
| 7,399,227 | B2 | 7/2008 | Michaelson et al. |
| 7,404,762 | B2 | 7/2008 | Moody |
| 7,470,184 | B2 | 12/2008 | Baerlocher et al. |
| 7,544,129 | B2 | 6/2009 | Baerlocher |
| 7,597,621 | B2 | 10/2009 | Baerlocher |
| 7,674,180 | B2 | 3/2010 | Graham et al. |
| 7,682,241 | B2 | 3/2010 | Baerlocher |
| 7,682,248 | B2 | 3/2010 | Baerlocher et al. |
| 7,780,520 | B2 | 8/2010 | Baerlocher |
| 7,824,257 | B2 | 11/2010 | Jubinville et al. |
| 7,837,547 | B2 | 11/2010 | Cannon |
| 7,841,939 | B2 | 11/2010 | Baerlocher et al. |
| 7,862,430 | B2 | 1/2011 | Baerlocher et al. |
| 7,901,282 | B2 | 3/2011 | Cannon |
| 7,914,377 | B2 | 3/2011 | Benbrahim et al. |
| 7,942,737 | B2 | 5/2011 | Cregan et al. |
| 7,963,845 | B2 | 6/2011 | Baerlocher |
| 7,985,133 | B2 | 7/2011 | Baerlocher et al. |
| 8,002,620 | B2 | 8/2011 | Nicely et al. |
| 8,025,561 | B2 | 9/2011 | Reddicks et al. |
| 8,033,903 | B2 | 10/2011 | Cregan |
| 8,070,597 | B2 | 12/2011 | Cuddy |
| 8,092,302 | B2 | 1/2012 | Cuddy et al. |
| 8,096,874 | B2 | 1/2012 | Nicely et al. |
| 8,113,939 | B2 | 2/2012 | Cannon |
| 8,123,604 | B2 | 2/2012 | Lancaster et al. |
| 8,128,491 | B2 | 3/2012 | Vasquez et al. |
| 8,152,630 | B2 | 4/2012 | Cohen |
| 8,157,646 | B2 | 4/2012 | Pawloski et al. |
| 8,172,660 | B2 | 5/2012 | Lancaster et al. |
| 8,197,337 | B2 | 6/2012 | DeWaal et al. |
| 8,210,937 | B2 | 7/2012 | Cregan et al. |
| 8,231,453 | B2 | 7/2012 | Wolf et al. |
| 8,376,836 | B2 | 2/2013 | Baerlocher et al. |
| 8,382,572 | B2 | 2/2013 | Hoffman et al. |
| 8,425,303 | B2 | 4/2013 | Kennedy et al. |
| 8,814,651 | B1 | 8/2014 | Humphrey et al. |
| 8,944,906 | B2 | 2/2015 | Ghaly |
| 9,177,442 | B2 | 11/2015 | Cannon |
| 9,196,127 | B2 | 11/2015 | Lovaas et al. |
| 9,269,234 | B2 | 2/2016 | Fredella et al. |
| 9,600,973 | B2 | 3/2017 | Naylor et al. |
| 9,600,975 | B2 | 3/2017 | Brown et al. |
| 2002/0045472 | A1 | 4/2002 | Adams |
| 2002/0052231 | A1 | 5/2002 | Fioretti |
| 2002/0094859 | A1 | 7/2002 | Hirsch et al. |
| 2002/0098883 | A1 | 7/2002 | Packes, Jr. et al. |
| 2002/0111207 | A1 | 8/2002 | Lind et al. |
| 2002/0111214 | A1 | 8/2002 | Lind et al. |
| 2002/0113369 | A1 | 8/2002 | Weingardt |
| 2002/0117803 | A1 | 8/2002 | Weingardt |
| 2002/0137562 | A1 | 9/2002 | Malone |
| 2002/0155877 | A1 | 10/2002 | Enzminger et al. |
| 2002/0169018 | A1 | 11/2002 | Schneier et al. |
| 2002/0177478 | A1 | 11/2002 | Glasson et al. |
| 2003/0017867 | A1 | 1/2003 | deKeller |
| 2003/0127793 | A1 | 7/2003 | Adams |
| 2003/0144050 | A1 | 7/2003 | Keaton et al. |
| 2003/0171986 | A1 | 9/2003 | Itkis et al. |
| 2003/0178771 | A1 | 9/2003 | Banyai |
| 2003/0181234 | A1 | 9/2003 | Falciglia, Sr. |
| 2003/0193136 | A1 | 10/2003 | Walker et al. |
| 2003/0195032 | A1 | 10/2003 | Enzminger et al. |
| 2004/0009806 | A1 | 1/2004 | Odom |
| 2004/0048647 | A1 | 3/2004 | Lind et al. |
| 2004/0053669 | A1 | 3/2004 | Gerrard et al. |
| 2004/0106445 | A1 | 6/2004 | Perrie et al. |
| 2004/0121834 | A1 | 6/2004 | Libby et al. |

(56) References Cited

U.S. PATENT DOCUMENTS

| | | | | |
|---|---|---|---|---|
| 2004/0130096 | A1 | 7/2004 | Duhamel | |
| 2004/0152499 | A1 | 8/2004 | Lind et al. | |
| 2004/0166920 | A1 | 8/2004 | Boyd et al. | |
| 2004/0176169 | A1 | 9/2004 | Lind et al. | |
| 2004/0178579 | A1 | 9/2004 | Lowell et al. | |
| 2004/0204225 | A1 | 10/2004 | Campo et al. | |
| 2004/0214626 | A1 | 10/2004 | Lind et al. | |
| 2004/0235555 | A1 | 11/2004 | Yarbrough et al. | |
| 2004/0242310 | A1 | 12/2004 | Perkins | |
| 2004/0251628 | A1 | 12/2004 | Kilby | |
| 2004/0266509 | A1 | 12/2004 | Bennett et al. | |
| 2005/0054404 | A1 | 3/2005 | Baerlocher | |
| 2005/0054415 | A1 | 3/2005 | Kaminkow et al. | |
| 2005/0059449 | A1 | 3/2005 | Yarbrough | |
| 2005/0059467 | A1 | 3/2005 | Saffari et al. | |
| 2005/0059468 | A1 | 3/2005 | Cannon | |
| 2005/0059469 | A1 | 3/2005 | Gail et al. | |
| 2005/0059470 | A1 | 3/2005 | Cannon | |
| 2005/0059471 | A1 | 3/2005 | Cannon | |
| 2005/0064932 | A1 | 3/2005 | Cannon | |
| 2005/0075161 | A1 | 4/2005 | McGlone et al. | |
| 2005/0096119 | A1 | 5/2005 | Lind et al. | |
| 2005/0096123 | A1 | 5/2005 | Cregan et al. | |
| 2005/0101370 | A1 | 5/2005 | Lind et al. | |
| 2005/0101387 | A1 | 5/2005 | Wolf | |
| 2005/0119042 | A1 | 6/2005 | Chamberlain et al. | |
| 2005/0130730 | A1 | 6/2005 | Lind et al. | |
| 2005/0148382 | A1 | 7/2005 | Fox | |
| 2005/0164771 | A1 | 7/2005 | Lind et al. | |
| 2005/0164772 | A1 | 7/2005 | Lind et al. | |
| 2005/0164773 | A1 | 7/2005 | Lind et al. | |
| 2005/0167916 | A1 | 8/2005 | Banyai | |
| 2005/0187014 | A1 | 8/2005 | Saffari et al. | |
| 2005/0227753 | A1 | 10/2005 | Luciano | |
| 2005/0255906 | A1 | 11/2005 | Lind et al. | |
| 2006/0084490 | A1* | 4/2006 | Khal | A63F 3/06 463/18 |
| 2006/0178196 | A1* | 8/2006 | Thomas | G07F 17/32 463/18 |
| 2006/0189375 | A1 | 8/2006 | Dodge | |
| 2007/0021185 | A1 | 1/2007 | Walker et al. | |
| 2007/0052172 | A1 | 3/2007 | Dargue | |
| 2007/0117611 | A1 | 5/2007 | Dodge | |
| 2007/0281774 | A1 | 12/2007 | Khal | |
| 2008/0076542 | A1 | 3/2008 | Iddings et al. | |
| 2008/0090651 | A1 | 4/2008 | Baerlocher | |
| 2008/0102921 | A1 | 5/2008 | Urquhart | |
| 2008/0102952 | A1 | 5/2008 | Walker et al. | |
| 2008/0108407 | A1* | 5/2008 | Conti | G07F 17/32 463/18 |
| 2008/0108430 | A1 | 5/2008 | Evans | |
| 2008/0108431 | A1 | 5/2008 | Cuddy et al. | |
| 2008/0254894 | A1 | 10/2008 | Michaelson et al. | |
| 2009/0042645 | A1 | 2/2009 | Graham et al. | |
| 2009/0075715 | A1 | 3/2009 | Coleman et al. | |
| 2009/0124362 | A1 | 5/2009 | Cuddy et al. | |
| 2009/0124364 | A1 | 5/2009 | Cuddy et al. | |
| 2009/0197664 | A1 | 8/2009 | Schultz | |
| 2010/0081497 | A1 | 4/2010 | Wolf et al. | |
| 2010/0120489 | A1 | 5/2010 | Meyer | |
| 2011/0003627 | A1 | 1/2011 | Nicely et al. | |
| 2011/0003637 | A1 | 1/2011 | LeFever | |
| 2011/0028201 | A1 | 2/2011 | Warner et al. | |
| 2011/0111843 | A1 | 5/2011 | Nicely et al. | |
| 2012/0322529 | A1 | 12/2012 | Gilbertson | |
| 2013/0079123 | A1 | 3/2013 | Nicely et al. | |
| 2013/0273995 | A1 | 10/2013 | Seaton et al. | |
| 2014/0018146 | A1 | 1/2014 | Zielinski et al. | |
| 2014/0228089 | A1 | 8/2014 | Seaton et al. | |
| 2015/0087381 | A1 | 3/2015 | Larson | |
| 2016/0110964 | A1 | 4/2016 | Brown et al. | |

* cited by examiner

1000

GAMING SYSTEM AND METHOD PROVIDING A KENO GAME INCLUDING BONUS TILES

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the U.S. Patent and Trademark Office patent file or records, but otherwise reserves all copyright rights whatsoever.

BACKGROUND

Keno is a relatively popular game that has been provided to players through various types of gaming systems. Many players enjoy playing keno.

SUMMARY

The present disclosure is directed to a gaming system and method providing a keno game including bonus tiles.

More specifically, in various embodiments of the present disclosure, the gaming system includes a processor and a memory device including a plurality of instructions that, when executed, cause the processor to at least, for a play of a keno game, cause a display device to display a first keno board including a first plurality of keno spots, wherein each keno spot of the first keno board is associated with a different keno number of a set of different keno numbers, form a player keno number set including one or more keno numbers of the set of different keno numbers, form a bonus spot keno number set associated with the first keno board, the bonus spot keno number set including one or more keno numbers of the set of different keno numbers, and for each keno number included in the bonus spot keno number set, cause the display device to display a bonus icon at a corresponding keno spot of the first keno board. The plurality of instructions, when executed, also cause the processor to, for a play of the first keno board: form a gaming system keno number set associated with the first keno board, the gaming system keno number set to include a plurality of keno numbers, determine a quantity of bonus draws for the first keno board based on a comparison of the bonus spot keno number set and the gaming system keno number set, and responsive to a determination that the quantity of bonus draws for the first keno board is greater than zero bonus draws: (1) cause the display device to display at least one bonus tile with the first keno board, (2) for each bonus tile displayed with the first keno board, add a bonus keno number to the set of different keno numbers, wherein each of the added bonus keno numbers maps to a different displayed bonus tile, (3) select a quantity of keno numbers from the set of different keno numbers based on in part the quantity of bonus draws, (4) add the selected keno numbers to the gaming system keno number set, and (5) determine any bonus awards based on a comparison of the keno numbers included in the gaming system keno number set and the bonus keno numbers that map to any of the displayed bonus tiles. The plurality of instructions, when executed, also cause the processor to determine any primary awards based on a comparison of the player keno number set with the gaming system keno number set associated with the first keno board, and cause the display device to display any bonus awards and primary awards associated with the first keno board.

Additional features and advantages are described herein, and will be apparent from, the following Detailed Description and the Figures.

DETAILED DESCRIPTION

Figure 1A:
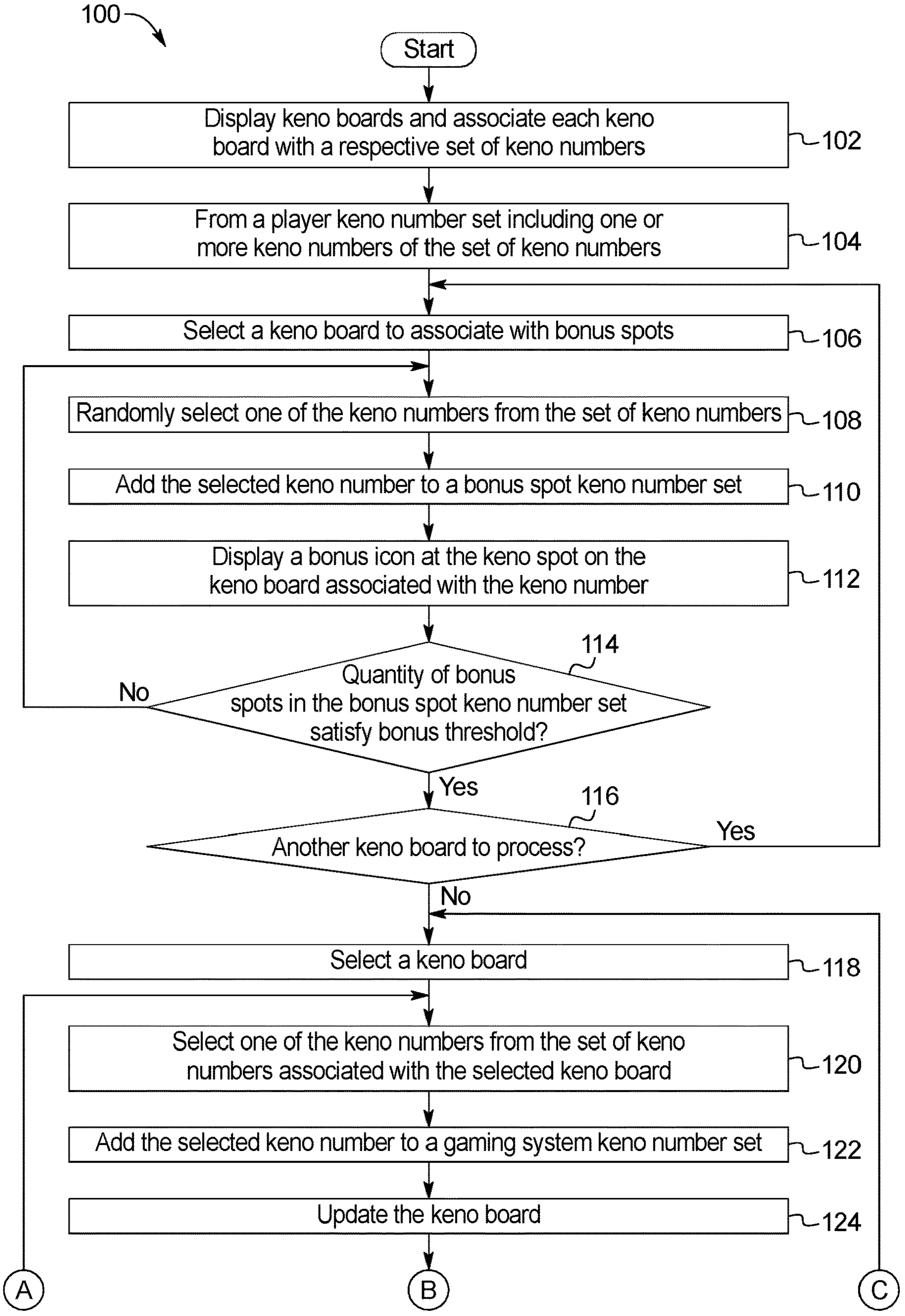
FIGS. 1A and 1B are a flowchart of an example process or method of operating the gaming system to provide one example embodiment of the keno game of the present disclosure.

Various embodiments of the present disclosure are directed to a gaming system and method providing a keno game including bonus tiles.

For a better and full understanding of the present disclosure, the following description of Keno games is provided. Keno in the United States traces back to a "Chinese lottery" game brought to the United States by Chinese immigrants in the 1800s. The "Chinese lottery" game utilized a board and a set of up to 120 characters instead of numbers. Early versions of American keno used characters on keno tickets rather than the numbers that are used today. The American keno game also reduced the number of characters to the more familiar eighty.

When gambling was legalized in the state of Nevada in 1931, the "Chinese lottery" game was referred to as "Horse Race Keno," reflecting the idea that the numbers are horses and the players want their wagered-on horses to come in. Later, the name was shortened to simply keno, although the game is still often referred to as "Horse Race Keno."

The general goal in a play of a Keno game is for a player to choose winning numbers from a plurality of numbers. In most standard versions of paper-based or video-based keno, a player receives a card with eighty squares numbered 1 to 80 and arranged in eight rows of ten squares (such as an 8×10 matrix or grid). The player can wager on any quantity of the numbers up to a designated quantity of the numbers, such as ten of the numbers. The player chooses numbers on which the player desires to wager by marking those numbers on a keno card (such as in a paper version of keno) or by selecting the numbers using a touch-screen display (such as in a video version of keno). A clerk or the processor of the video display records the player's wager(s). The player pays for each number played or wagered on.

In a paper version, the keno numbers appear on eighty ping pong-type balls that can be tossed about in a clear plastic sphere or spun around in a wire bird cage. Keno numbers were at one time drawn from such apparatuses without replacement using a manually powered keno goose. In a video version, a computer generates the keno numbers without replacement using a random number generator. After each number is randomly chosen, that number is shown electronically on keno boards throughout the casino or on the video display. An award is provided to the player based on a quantity of matches between the player-selected number(s) and the game-generated number(s).

Many casinos offer "multi-race" cards that enable the player to play the same set of numbers over multiple games. One type of "multi-play" game enables the player to wager on a single set of numbers over as many as twenty games. When finished, the player must return to the keno station and cash in any wins. "Stray and play" tickets are also available, and enable the player to play a version of keno called "walk away keno." Players can purchase a keno ticket for an extended number of games, enjoy other activities in the casino, and return at a later time or even a later date to have the tickets checked by a computer for winning games.

Another option for keno players is a combination or "way" ticket. A combination ticket enables the player to group different numbers, wherein each group has the same amount numbers, creating more than one way to win. For example, a 3×3×3, nine spot ticket enables the player to select a combination of three groups of three numbers. The player can, for example, mark a first group of three numbers with the letter "A," mark a second group with the letter "B," and mark a third group the letter "C." This ticket enables the player to win on any winning combination of three numbers for any of the three groups. Hitting any winning combination pays as though a single ticket had been played. Essentially, the player plays three games on one card. In some keno games, playing three numbers in three games enables the player to play, or provides to the player, an additional nine spot game.

The "way" ticket enable players to wager more money on more numbers. In reality, playing a way or combination ticket offers no mathematical advantage, and causes no disadvantage, to the player. Some casinos offer discounted minimum wagers with "way" tickets. If the player plays three or more ways, many casinos will discount the price per "way" (e.g., let the player wager $0.50 per wager instead of a usual $1 minimum). However, such casinos typically only pay back on the player's actual wager.

1. Example Method

Figure 1B:
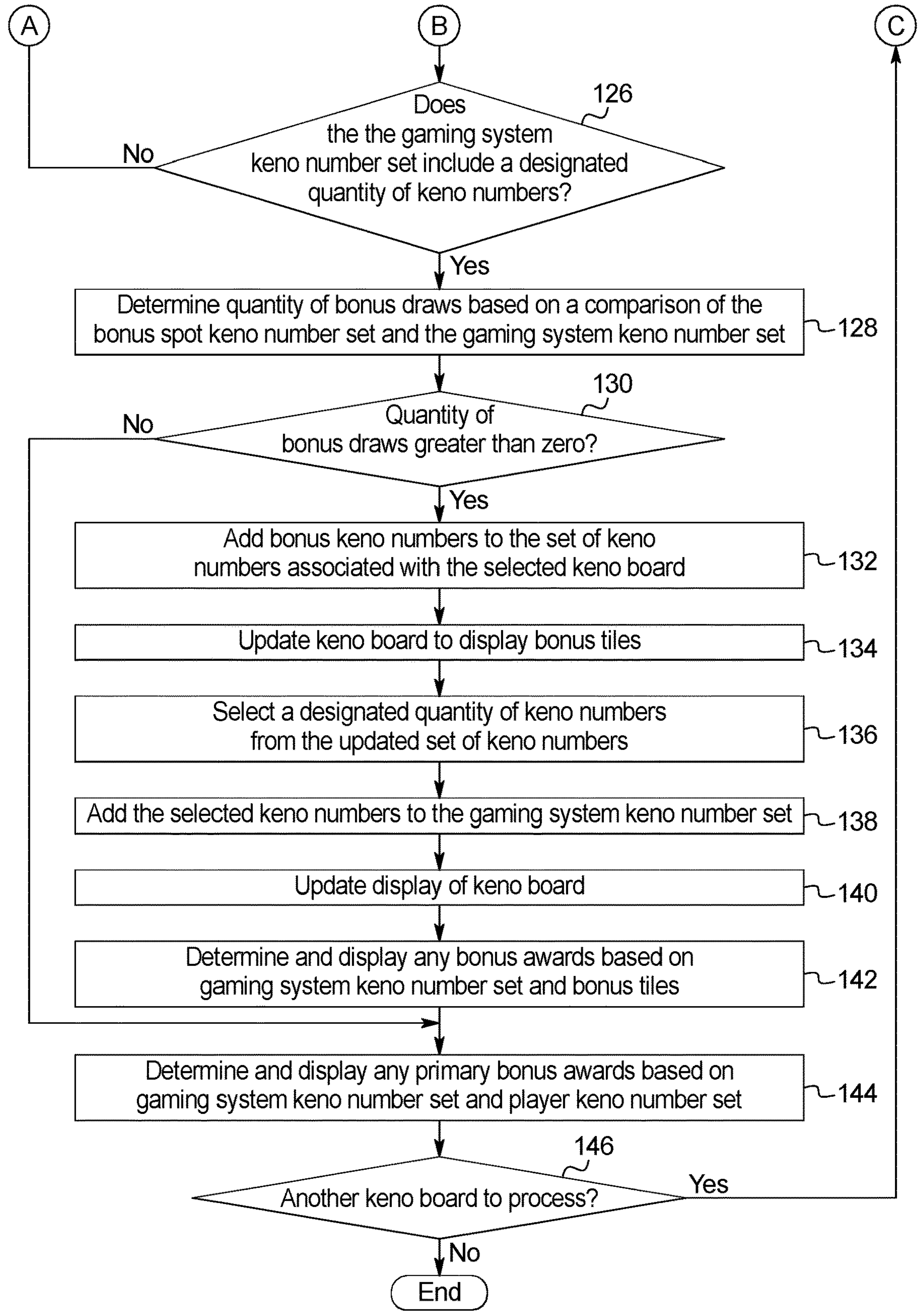

FIGS. 1A and 1B are a flowchart of an example process or method 100 of operating a keno gaming system of one example embodiment of the present disclosure which provided plays of a keno game. In various embodiments, the process 100 is represented by a set of instructions stored in one or more memories and executed by one or more processors. Although the process 100 is described with reference to the flowchart shown in FIG. 1, it should be appreciated that many other processes of performing the acts associated with this illustrated process 100 may be employed. For example, the order of certain of the illustrated blocks and/or diamonds may be changed, certain of the illustrated blocks and/or diamonds may be optional, and/or certain of the illustrated blocks and/or diamonds may not be employed. It should be appreciated that this keno game maybe provided as a primary game or as a secondary game in accordance with the present disclosure. It should also be appreciated that this keno game maybe provided as a wagering game or as a casual or non-wagering game in accordance with the present disclosure.

In operation of this example embodiment, process 100 begins and, for the play of the game, the gaming system displays, via a display device, a plurality of keno boards and associates each of the keno boards with a respective set of keno numbers, as indicated by block 102. For example, in one example embodiment, for the play of the game, the gaming system displays three keno boards each including a plurality of keno spots. In this example, each of the keno boards includes eighty keno spots. The gaming system also associates each of the three keno boards with a different set of keno numbers. In this example, each keno spot is associated with a keno number of the corresponding set of keno numbers. For example, each keno board includes eighty keno spots and is associated with a set of keno numbers 1 to 80.

The gaming system forms a player keno number set including one or more keno numbers of a set of keno numbers (such as two to ten of the keno numbers), as indicated by block 104. More specifically, in this example embodiment, the gaming system receives, from the player via an input device, a selection of the one or more keno numbers of the set of keno numbers to include in the player keno number set or an indication that the player desires the gaming system to select the one or more keno numbers of the set of keno numbers to include in the player keno number set. In this example embodiment, the gaming system uses the player keno number set for each of the keno boards.

The gaming system then begins assigning bonus spots to each of the keno boards by selecting one of the keno boards to associate with bonus spots, as indicated by block 106. The gaming system randomly selects one of the keno numbers from the set of keno numbers, as indicated by block 108. The gaming system then adds the selected keno number to a bonus spot keno number set associated with the selected keno board, as indicated by block 110. The gaming system updates the selected keno board by causing the display device to display a bonus icon at the keno spot on the selected keno board that corresponds to the selected keno number, as indicated by block 112.

The gaming system determines if the quantity of bonus spots in the bonus spot keno number set satisfies a bonus threshold, as indicated by diamond 114. For example, in one example embodiment, the bonus threshold may be three bonus spots. If, at diamond 114, the gaming system determines that the quantity of bonus spots in the bonus spot keno number set associated with the keno board does not satisfy the bonus threshold, the process 100 returns to block 108 to randomly select another keno number.

If, at diamond 114, the gaming system determines that the quantity of bonus spots in the bonus spot keno number set satisfies the bonus threshold, then the gaming system determines whether there is another keno board to process, as indicated by diamond 116. If, at diamond 116, the gaming system determines that there is another keno board to process (e.g., there is another keno board to associate with bonus spots), then the process 100 returns to block 106 to select another keno board to associate with bonus spots.

If, at diamond 116, the gaming system determines that there is not another keno board to process (e.g., all of the keno boards of the play have been associated with bonus spots), then the gaming system begins forming a gaming system keno number set for a keno board by selecting a keno board, as indicated by block 118.

The gaming system selects one of the keno numbers in the set of keno numbers associated with the selected keno board, as indicated by block 120. The gaming system adds the selected keno number to the gaming system keno number set associated with the selected keno board, as indicated by block 122. The gaming system updates the selected keno board, as indicated by block 124. For example, in one example embodiment, the gaming system causes the display device to highlight a keno spot on the selected keno board that corresponds to the selected keno number.

The gaming system then determines whether the gaming system keno number set associated with the selected keno board includes a designated quantity of keno numbers, as indicated by diamond 126. For example, in one example embodiment the designated quantity of keno numbers is twenty keno numbers and the gaming system determines whether the gaming system keno number set includes twenty keno numbers.

If, at diamond 126, the gaming system determines that the gaming system keno number set associated with the selected keno board does not include the designated quantity of keno numbers (e.g., includes less than the designated quantity of keno numbers), then the process 100 returns to block 120 to select another one of the keno numbers from the set of keno numbers associated with the selected keno board.

If, at diamond 126, the gaming system determines that the gaming system keno number set associated with the selected keno board includes the designated quantity of keno numbers, then the gaming system determines a quantity of bonus draws associated with the selected keno board based on a comparison of the bonus spot keno number set and the gaming system keno number set, as indicated by block 128. For example, the gaming system compares the keno numbers included in the gaming system keno number set to the keno numbers included in the bonus spot keno number set to determine whether there are any matches (e.g., whether both the gaming system keno number set and the bonus spot keno number set include the same keno number (e.g., the keno number "3")). In this example embodiment, for each matching keno number that the gaming system identifies, the gaming system issues (or provides) the player with one bonus draw. For example, if the gaming system identifies three matching keno numbers (e.g., the gaming system keno number set and the bonus spot keno number set include three matching keno numbers), then the gaming system provides the player with three bonus draws.

The gaming system then determines whether the quantity of bonus draws associated with the selected keno board is greater than zero, as indicated by diamond 130.

If, at diamond 130, the gaming system determines that the quantity of bonus draws associated with the selected keno board is not greater than zero (e.g., the gaming system determined at block 128 that the gaming system keno number set and the bonus spot keno number set did not include any matching keno numbers), then the process 100 proceeds to block 144 to determine any primary awards.

If, at diamond 130, the gaming system determines that the quantity of bonus draws associated with the selected keno board is greater than zero (e.g., the gaming system determined at block 128 that the gaming system keno number set and the bonus spot keno number set included at least one matching keno number), then the gaming system updates the set of keno numbers associated with the keno board by adding bonus keno numbers to the set of keno numbers associated with the keno board, as indicated by block 132. For example, in one example embodiment, the gaming system adds bonus keno numbers 81 to 90 to the set of keno numbers associated with the keno board.

The gaming system updates the selected keno board to display bonus tiles, as indicated by block 134. For example, the gaming system causes the display device to add a row of keno spots to the selected keno board. In one example embodiment, each of the bonus tiles corresponds to a different one of the bonus keno numbers. Thus, in that example embodiment, the selected keno board includes the same number of keno spots as keno numbers included in the set of keno numbers associated with the selected keno board.

The gaming system then selects a designated quantity of keno numbers from the updated set of keno numbers, as indicated by block 136. For example, in one example embodiment, the designated quantity of keno numbers is the quantity of bonus draws provided by the gaming system to the player at block 128.

The gaming system adds the selected keno numbers to the gaming system keno number set, as indicated by block 138. The gaming system then updates the display of the selected keno board, as indicated by block 140. For example, in one example embodiment, the gaming system causes the display device to highlight keno spot(s) on the selected keno board that correspond to the keno numbers of the bonus draw(s).

The gaming system determines any bonus award based on a comparison of the gaming system keno number set with the keno number associated with the bonus tiles and displays any determined bonus award, as indicated by block 142. For example, each of the bonus tiles may be associated with different quantities of bonus credits, plays, jackpot winnings, etc.

The gaming system determines any primary award based on a comparison of the player keno number set with the gaming system keno number set and displays any determined primary award, as indicated by block 144. For example, the gaming system may determine any primary award based on the quantity of "Hits" that occur during the play of the keno game associated with the selected keno board. A "Hit" occurs when the gaming system selects a keno number to include in the gaming system keno number set that is also included in the player keno number set. For example, in one example embodiment, the gaming system compares the quantity of "Hits" with a paytable to determine any primary award to provide the player for the selected keno board.

The gaming system then determines whether there is another keno board to process, as diamond 146 indicates.

If, at diamond 146, the gaming system determines that there is another keno board to process (e.g., a keno board that is not associated with a populated gaming system keno number set), the process 100 returns to block 118 to select the unprocessed keno board.

If, at diamond 146, the gaming system determines that there is not another keno board to process (e.g., all of the keno boards of the current play of the game have been processed (e.g., are associated with a populated gaming system keno number set)), the process 100 then ends.

The bonus award may be any suitable award such as, but not limited to, one or more of: (1) monetary credits or currency, (2) non-monetary credits or currency, (3) a modifier (such as a multiplier) used to modify one or more awards (such as the primary award), (4) one or more free plays of a game (such as one or more free plays of the keno game), (5) one or more plays of one or more bonus games (such as a free spin of an award wheel), (6) one or more lottery based awards (such as one or more lottery or drawing tickets), (7) a wager match for one or more plays of the keno game, (8) an increase in an average expected payback percentage of a bonus game and/or an average expected payback percentage of the keno game for one or more plays, (9) one or more comps (such as a free dinner or a free night's stay at a hotel); (10) one or more bonus or promotional credits usable for online play, (11) one or more player tracking points, (12) a modifier (such as a multiplier) for player tracking points or credits, (13) an increase in a membership or player tracking level, (14) one or more coupons or promotions usable within a gaming establishment and/or outside of the gaming establishment (e.g., a 20% off coupon for use at a retail store or a promotional code providing a deposit match for use in association with an online casino), (15) an access code usable to unlock content on the Internet, (16) a progressive jackpot or other progressive award, (17) a high value product or service (such as a car), (18) a low value product or service (such as a teddy bear), and (19) an additional one or more draws.

2. Example Gaming System Operation

FIGS. 2A, 2B, 2C, 2D, 2E, 2F, 2G, 2H, 2I, 2J, and 2K are screenshots of an example embodiment of the gaming system of the present disclosure configured to operate one example of the keno game of the present disclosure.

In this example embodiment, the keno game is a multi-play game that enables a player to wager on a single set of numbers over multiple keno boards such as three keno boards. For example, at the start of the play of the keno game, the player may select a plurality of keno numbers to include in their player keno number set. The gaming system then uses the selected keno numbers for each of the three keno boards. In this example embodiment, the keno boards are played one-at-a-time rather than simultaneously. Thus, in this example embodiment, one play of the keno game includes three iteratively played games.

In this example embodiment, each of the keno boards is associated with a set of keno numbers including the numbers 1 through 80 (though it should be appreciated that the keno game may be associated with any suitable numbers or range or numbers and/or any suitable symbols (such as letters, characters, themed images, and the like) instead of or in addition to numbers). Each keno board also includes a plurality of keno spots that correspond (e.g., map) to the keno numbers of the set of keno numbers associated with the respective keno board.

In this example embodiment, when play of the keno game is initiated (e.g., after a start button is actuated by the player), the gaming system randomly assigns and displays bonus icons to three of the keno spots of each of the keno boards. During play of a keno board, if the gaming system selects a keno number associated with a bonus icon displayed on the keno board to include in the gaming system keno number set, the player is awarded one bonus draw. In this example embodiment, once the gaming system keno number set includes a designated quantity of keno numbers (e.g., twenty keno numbers), the gaming system determines how many bonus draws to award (or provide) the player for that keno board. If the gaming system determines to award the player any bonus draws, the gaming system adds to or expands the keno board by adding ten bonus tiles to the keno board. In this example embodiment, each of the bonus tiles is associated with a bonus award. For example, the bonus award may include bonus credits (or currency), additional bonus draws, jackpot awards, etc. The gaming system also adds bonus keno numbers to the set of keno numbers from which it selects to include in the gaming system keno number set. In this example embodiment, each of the bonus keno numbers corresponds (e.g., maps) to a different bonus tile of the keno board. The gaming system then performs the bonus draw(s) by selecting the designated quantity of bonus draw(s) from the updated set of keno numbers (e.g., the initial set of keno numbers 1 through 80 that map to the initial keno spots on the keno board and additional bonus keno numbers 81 through 90 that map to the bonus tiles added to the "expanded" keno board). In this example embodiment, the gaming system adds the selected keno numbers to the gaming system keno number set.

In this example embodiment, the gaming system then determines and displays to the player any bonus awards to award (or provide) to the player for the keno board based on whether any of the keno numbers of the bonus draw(s) correspond to any of the bonus tiles. The gaming system also determines and displays to the player any primary awards to award (or provide) to the player for the keno board based on the quantity of "Hits" that occur on the keno board. In this example embodiment, a "Hit" occurs when the gaming system selects a keno number to include in the gaming system keno number set that is also included in the player keno number set, as described below. The gaming system then determines whether there is another keno board to play during the play of the keno game.

In this example embodiment, the gaming system displays (such as on a display device as described below) a first keno board 200, a second keno board 210, and a third keno board 220. Each of the keno boards 200, 210, and 220 includes a plurality of keno number positions (not labeled for clarity). The gaming system displays a different one of the keno numbers of the set of keno numbers 1 through 80 at each of the keno number positions (sometimes referred to herein as "keno spots" or "keno tiles") of each of the keno boards 200, 210, and 220. In this example embodiment, the gaming system displays each of the keno boards 200, 210, and 220 as an 8×10 grid (or matrix) of keno spots.

In this example embodiment, each of the keno boards 200, 210, and 220 also includes a corresponding "Hits" counter 202, 212, and 222, respectively. The "Hits" counters 202, 212, and 222, indicates a quantity of "Hits" that occur on the corresponding keno board 200, 210, and 220.

In this example embodiment, each of the keno boards 200, 210, and 220 also includes a corresponding credits meter 204, 214, and 216, respectively. The credits meters 204, 214, and 224, indicate the quantity of credits awarded to the player for the play of the corresponding keno board 200, 210, and 220.

In this example embodiment, the gaming system also displays a paytable 270 that indicates a plurality of quantities of "Hits" and a corresponding award amount for each "Hit." In this example embodiment, the quantity of "Hits" included in the paytable 270 and the corresponding award amounts are determined based on a player keno number set including ten keno numbers and a bet of 15 credits. It should be appreciated that both the quantity of "Hits" and the corresponding award amounts included in the paytable 270 may vary when the player keno number includes fewer than or more than ten keno numbers and/or when the bet is greater than or less than 15 credits.

The gaming system also displays a plurality of meters including an award meter 282 that display any awards won for a play of the keno game (in credit form or currency form), a bet meter 284 that displays any bet placed on a play of the keno game (in credit form or currency form), and a credit meter 286 that displays the credit balance of the player (in credit form or currency form). In this example embodiment, the award meter 282 displays the sum of the credits awarded to the player for each of the keno boards 200, 210, and 220 (e.g., the sum of the credits displayed in the credit meters 202, 212, and 222).

The gaming system also displays a plurality of buttons actuatable by the player including a Start button 292 that, when actuated by the player, causes the gaming system to initiate a play of the keno game and/or initiate a play of a keno board, a Clear button 294 that, when actuated by the player, causes the gaming system to remove any keno numbers from the player keno number set, and a Quick Pick button 296 that, when actuated by the player, causes the gaming system to randomly determine which keno numbers to include in the player keno number set. The gaming system also displays a decrease button 298 and an increase button 299 included in the bet meter 284 that, when actuated by the player, respectively increase and decrease the quantity of credits or currency displayed by the bet meter 284.

Figure 2A:
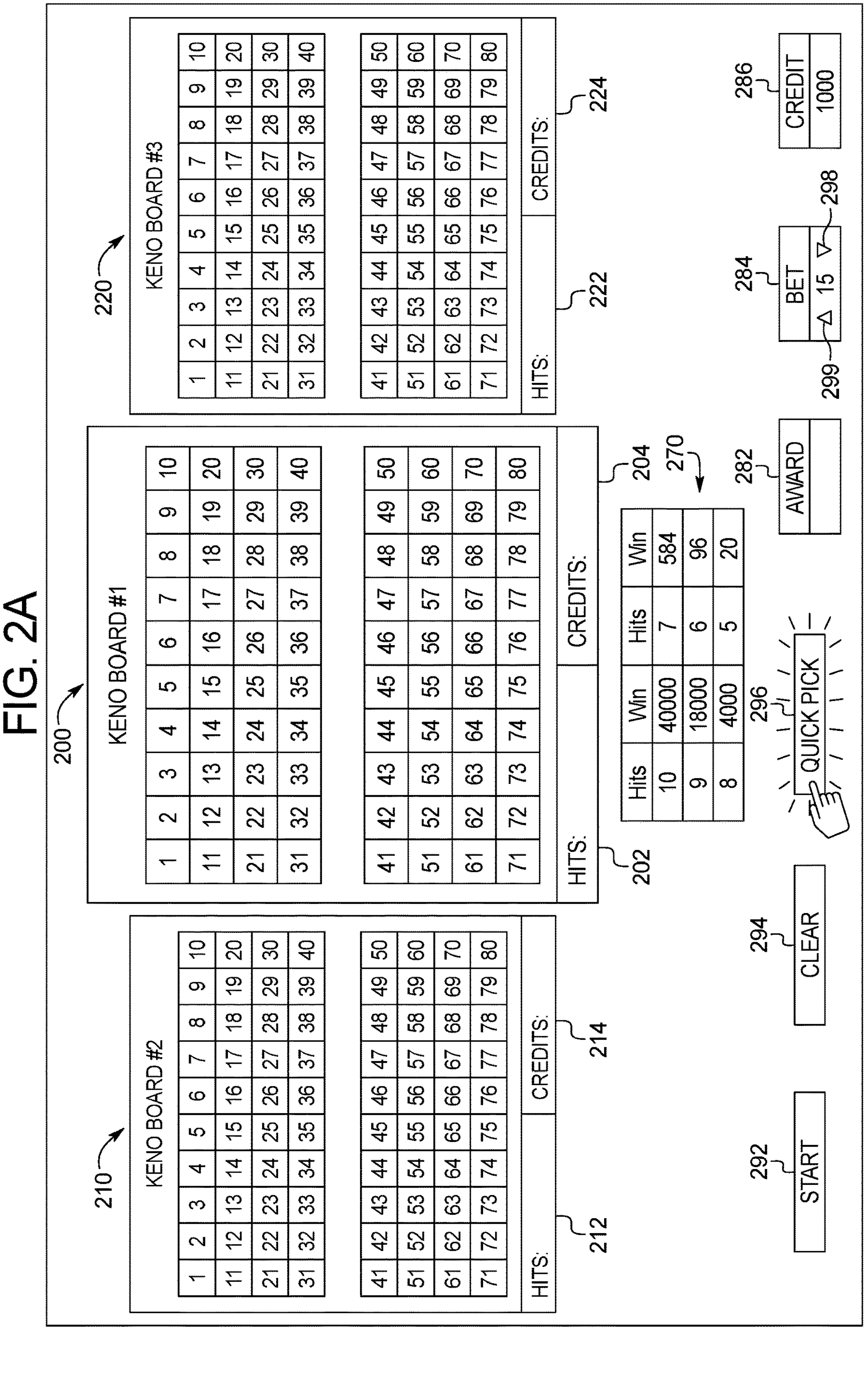
FIGS. 2A, 2B, 2C, 2D, 2E, 2F, 2G, 2H, 2I, 2J, and 2K are screen shots of an example embodiment of the gaming system of the present disclosure providing one example of the keno game of the present disclosure.

Turning to FIG. 2A, the gaming system receives a deposit of value from the player and provides the player with 1,000 credits, as shown in the credit meter 286. The gaming system displays a desired bet of 15 credits in the bet meter 284, and enables the player to modify the desired bet using the decrease bet button 298 and/or the increase bet button 299. The gaming system enables the player to select which of the keno numbers to include in the player keno number set. More specifically, in this example embodiment, the gaming system enables the player to: (1) manually select between two and ten of the keno numbers to include in the player keno number set (such as via a touch screen or a dedicated button or buttons, described below), or (2) actuate the Quick Pick button 296 to cause the gaming system to randomly select ten of the keno numbers to include in the player keno number set. Here, the gaming system receives an actuation of the Quick Pick button 296.

Figure 2B:
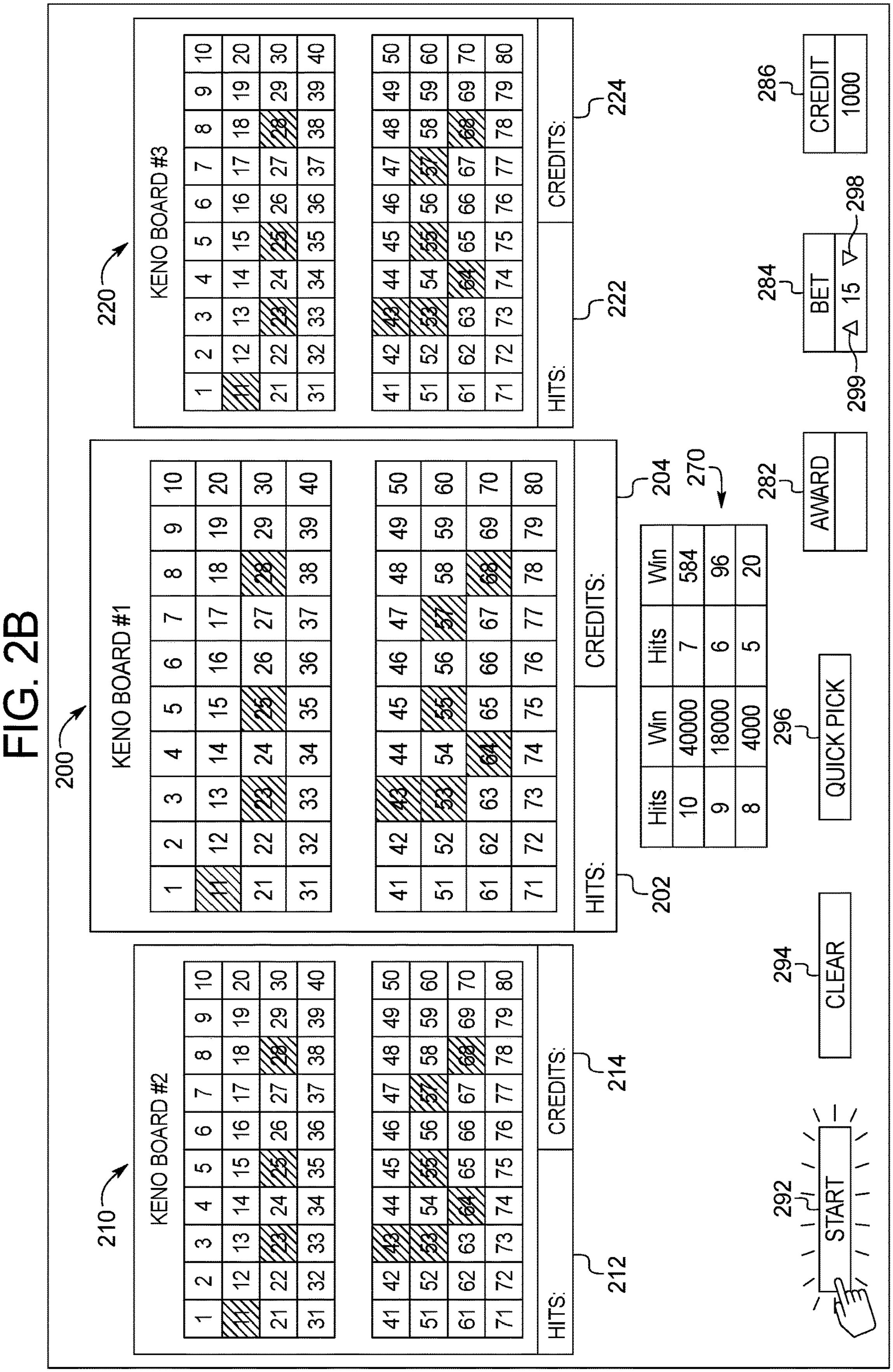

As shown in FIG. 2B, upon receiving the actuation of the Quick Pick button 296, the gaming system randomly selects the keno numbers 11, 23, 25, 28, 43, 53, 55, 57, 64, and 68 to include in the player keno number set. In this example embodiment, the gaming system displays a hatch pattern each of the keno number positions corresponding to the keno numbers of the player keno number set for clarity. In should be appreciated that the gaming may indicate the keno numbers of the player keno number set in any suitable manner, such as by shading each of the corresponding keno number positions, coloring each of the corresponding keno number positions, displaying an icon in each of the corresponding keno number positions, changing the typeface used for the corresponding keno number positions, etc. In this example embodiment, the gaming system displays the keno numbers of the player keno number set in each of the three keno boards 200, 210, and 220. After the gaming system forms the player keno number set, the gaming system receives an actuation of the Start button 292 from the player.

Figure 2C:
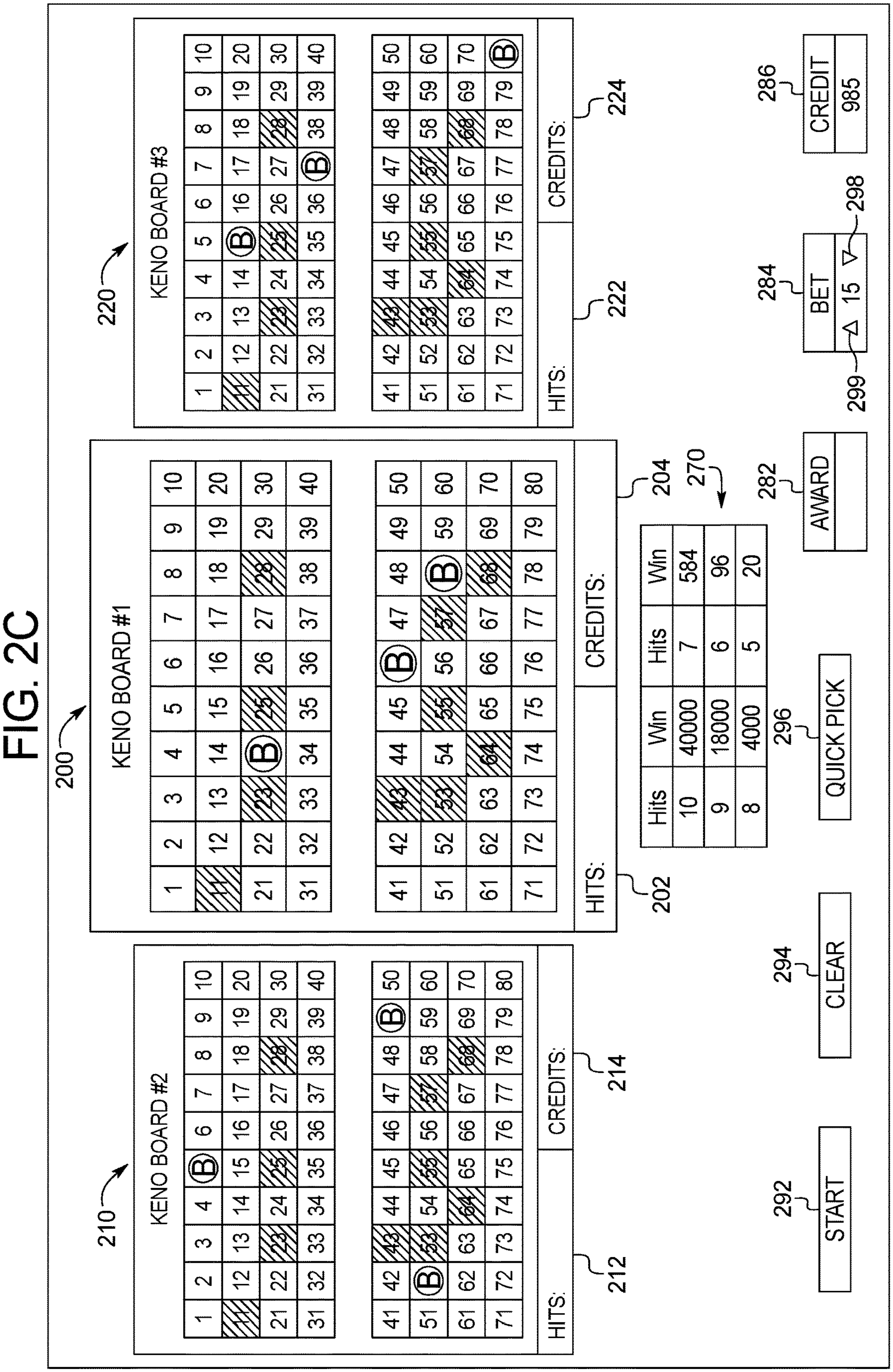

As shown in FIG. 2C, upon receipt of the actuation of the Start button 292, the gaming system reduces the credit balance of the player by the desired 15 credit bet (from 1,000 credits to 985 credits, as shown in the credit meter 286). The gaming system also randomly adds a plurality of bonus icons to each of the keno boards 200, 210, and 220. In this example embodiment, the gaming system selects three keno numbers, adds the three selected keno numbers to a bonus spot keno number set associated with the keno board, and adds three bonus icons to the corresponding keno number positions of each of the keno boards 200, 210, and 220. For example, with respect to the first keno board 200, the gaming system selects the keno numbers 24, 46, and 58, adds the keno numbers 24, 46, and 58 to a bonus spot keno number set associated with the first keno board 200, and displays bonus icons at the corresponding keno number positions "24," "46," and "58." With respect to the second keno board 210, the gaming system selects the keno numbers 5, 49, and 52, adds the keno numbers 5, 49, and 52 to a bonus spot keno number set associated with the second keno board 210, and displays bonus icons at the corresponding keno number positions "5," "49," and "52." With respect to the third keno board 220, the gaming system selects the keno numbers 15, 37, and 80, adds the keno numbers 15, 37, and 80 to a bonus spot keno number set associated with the third keno board 210, and displays bonus icons at the corresponding keno number positions "15," "37," and "80." It should be appreciated that the gaming system may initially select any suitable quantity of keno numbers to associate with the bonus icons before forming the gaming system keno number sets for each of the keno boards 200, 210, and 220.

Figure 2D:
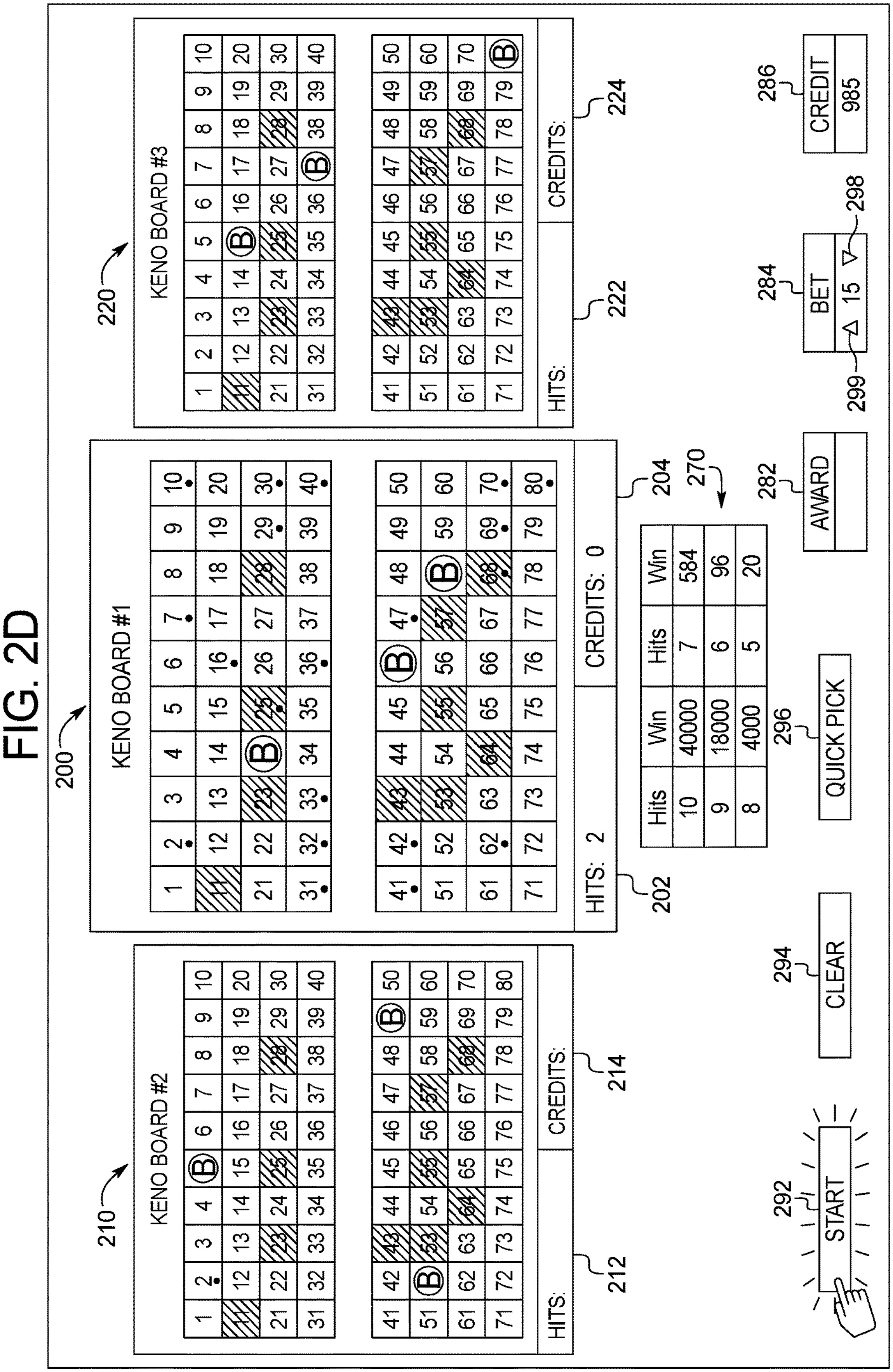

As shown in FIG. 2D, after the bonus icons have been added to each of the keno boards 200, 210, and 200, the gaming system selects a keno board (e.g., the first keno board 200) and begins sequentially selecting the twenty keno numbers to include in the gaming system keno number set associated with the first keno board 200. In this example embodiment, the gaming system identifies the selected keno board by displaying the selected keno board as the center keno board of the three keno boards and enlarging the selected board relative to the other two keno boards. In this example embodiment, the gaming system selects the keno numbers to include in the gaming system keno number set from the set of keno numbers without replacement. In this example embodiment, the gaming system selects the keno numbers 2, 7, 10, 16, 25, 29, 30, 31, 32, 33, 36, 40, 41, 42, 47, 62, 68, 69, 70, and 80 to include in the gaming system keno number set associated with the first keno board 200. In this example embodiment, the gaming system displays an indicator, such as a ball icon, in the keno number position of each keno number included in the gaming system keno number set (not labeled for clarity), though it should be appreciated that the gaming system may indicate the keno numbers included in the gaming system keno number set in any suitable manner.

The gaming system makes a bonus determination for the play of the first keno board 200 by determining how many bonus spot "Hits" occurred. A bonus spot "Hit" occurs when a keno number in the gaming system keno number set associated with a keno board is also included in the bonus spot keno number set associated with the keno board. In this instance, none of the keno numbers in the gaming system keno number set associated with the first keno board 200 (e.g., the keno numbers 2, 7, 10, 16, 25, 29, 30, 31, 32, 33, 36, 40, 41, 42, 47, 62, 68, 69, 70, and 80) are also included in the bonus spot keno number set associated with the first keno board 200 (e.g., the keno numbers 24, 46, and 58). Accordingly, the player is not issued (or provided) any bonus tiles for the play of the first keno board 200 of the keno game.

The gaming system makes a primary award determination for the play of the first keno board 200 by determining how many "Hits" occurred. As noted above, a "Hit" occurs when a keno number in the gaming system keno number set is also included in the player keno number set. In this instance, the gaming system determines that two "Hits" occurred because the keno numbers 25 and 68 are each included in both the player keno number set and the gaming system keno number set, as shown in the hits meter 202. The gaming system indicates when a "Hit" occurs by displaying a "Hit" indicator (not labeled for clarity) in the keno number position of each keno number included in both the player keno number set and the gaming system keno number set, though it should be appreciated that the gaming system may indicates "Hits" in any suitable manner. The gaming system determines based on the paytable 270 that a quantity of two "Hits" is not associated with any award amount and, therefore, does not provide any award for the play of the first keno board 200 of the keno game, as shown in the credit meter 204.

After the gaming system determines any primary award associated with the first keno board 200, the gaming system receives an actuation of the Start button 292 from the player.

Figure 2E:
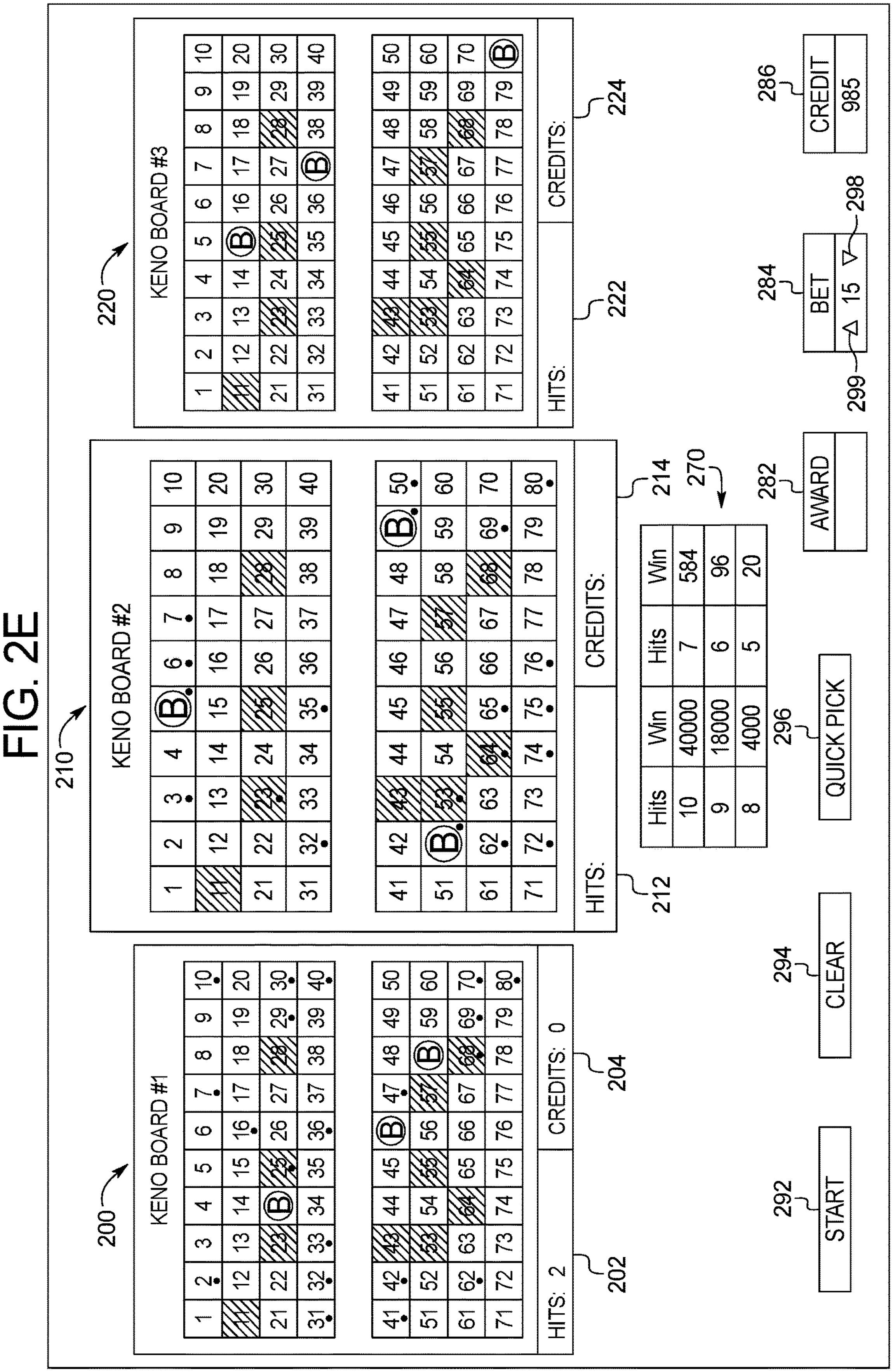

As shown in FIG. 2E, upon receipt of the actuation of the Start button 292, the gaming system selects another keno board (e.g., the second keno board 210) and highlights the selected keno board by displaying the selected keno board as the center keno board of the three keno boards and enlarging the selected board relative to the other two keno boards. The gaming system then begins sequentially selecting the twenty keno numbers to include in the gaming system keno number set associated with the second keno board 210. In this example embodiment, the gaming system selects the keno numbers 3, 5, 6, 7, 23, 32, 35, 49, 50, 52, 53, 62, 64, 65, 69, 72, 74, 75, 76, and 80 to include in the gaming system keno number set associated with the second keno board 210. As noted above, the gaming system displays an indicator (e.g., a ball icon) in the keno number position of each keno number included in the gaming system keno number set associated with the second keno board 210 (not labeled for clarity).

The gaming system makes a bonus determination for the play of the second keno board 210 by determining how many bonus spot "Hits" occurred. As noted above, a bonus spot "Hit" occurs when a keno number in the gaming system keno number set associated with a keno board is also included in the bonus spot keno number set associated with the keno board. The gaming system indicates when a bonus spot "Hit" occurs by displaying a bonus spot "Hit" indicator (not labeled for clarity) in the keno number position of each keno number included in both the bonus spot keno number set and the gaming system keno number set, though it should be appreciated that the gaming system may indicate bonus spot "Hits" in any suitable manner. In this instance, the gaming system determines that three bonus spot "Hits" occurred because the keno numbers 5, 49, and 52 are each included in both the bonus spot keno number set (e.g., the keno numbers 5, 49, and 52) and the gaming system keno number set associated with the second keno board 210.

Figure 2F:
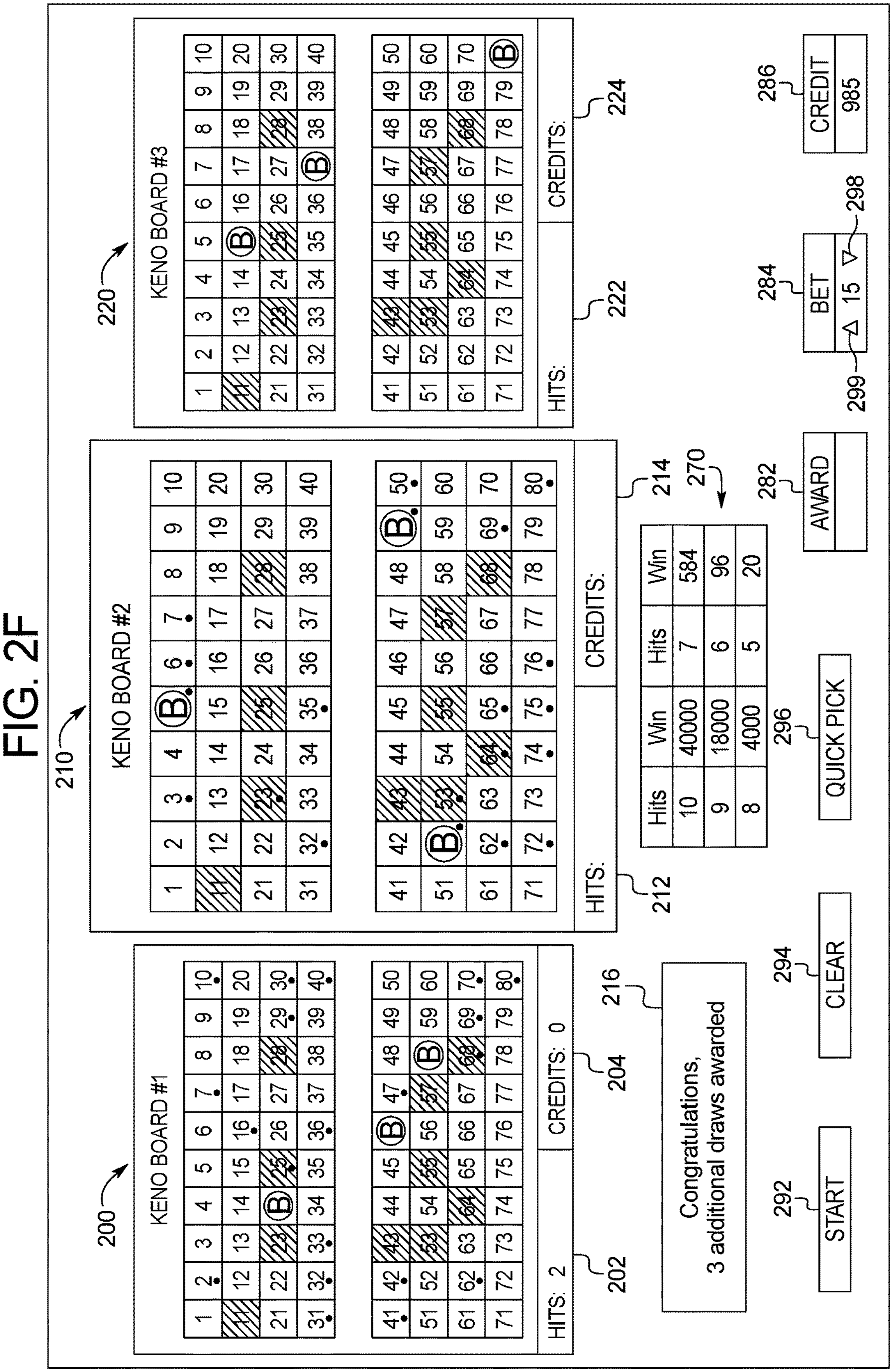

As shown in FIG. 2F, in this example embodiment, the gaming system awards the player a bonus draw for each bonus spot "Hit" that occurred. Accordingly, in this example embodiment, the player is provided three bonus draws for the play of the second keno board 210. In this example embodiment, the gaming system indicates the awarding of the three bonus draws via a text box 216.

Figure 2G:
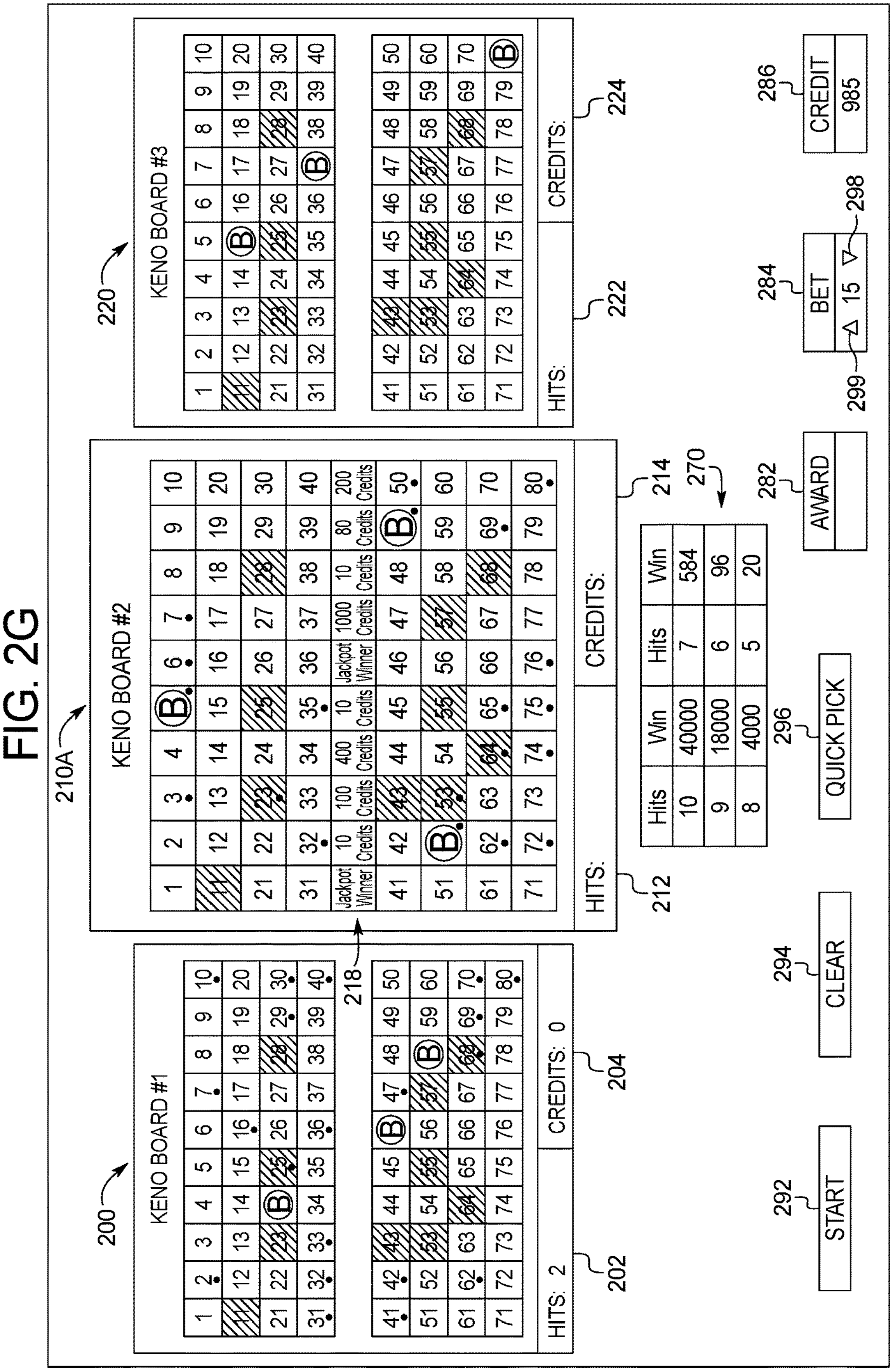

As shown in FIG. 2G, the gaming system then updates the second keno board 210 by adding bonus tiles. In this example embodiment, an updated second keno board 210A includes the keno spots of the initial second keno board 210, including (1) the indicators for the keno number positions associated with the player keno number set, (2) the indicators for the keno number positions associated with the gaming system keno number set, and also includes bonus tiles in a bonus row 218. In this example embodiment, the gaming system also adds bonus keno numbers 81 through 90 to the set of keno numbers associated with the second keno board 210 (e.g., the keno numbers 1 through 80) to form an updated set of keno numbers associated with the updated second keno board 210A (e.g., keno numbers 1 through 90, excluding the keno numbers included in the gaming system keno number set associated with the second keno board 210). In this example embodiment, each of the bonus tiles of the bonus row 218 is associated with a different bonus keno number included in the updated set of keno numbers associated with the updated second keno board 210A. In this example embodiment, each of the bonus tiles of the bonus row 218 provides a bonus award. For example, the first bonus tile of the bonus row 218 ("Jackpot Winner") may correspond (e.g., map) to the bonus keno number 81. In that example, if the gaming system selects the keno number 81 from the updated set of keno numbers associated with the updated second keno board 210A, the gaming system displays an indicator in the first bonus tile of the bonus row 218.

Figure 2H:
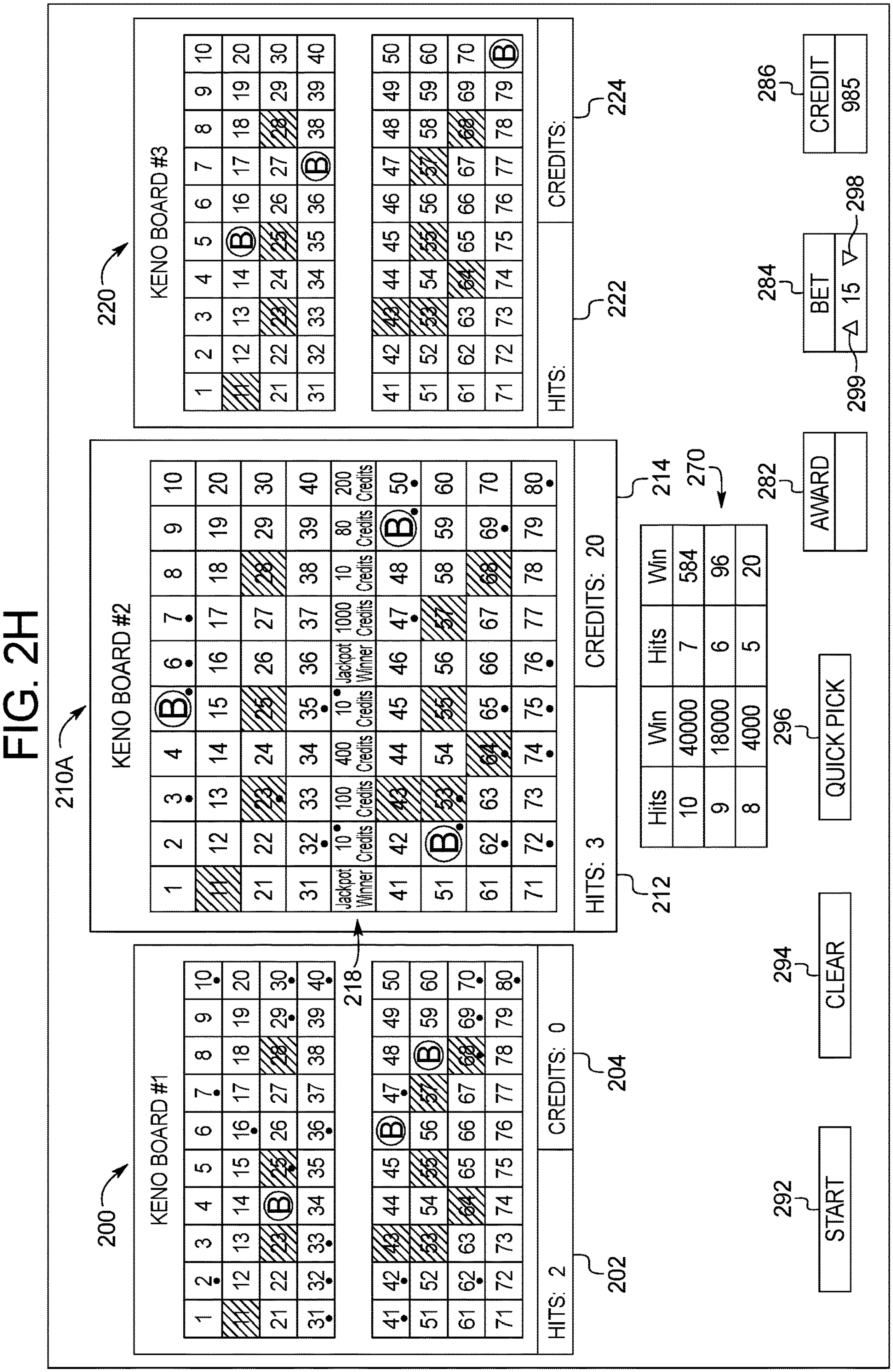

As shown in FIG. 2H, the gaming system then sequentially selects additional keno numbers (e.g., performs the additional draws) from the updated set of keno numbers associated with the second keno number set 210A.

In this example embodiment, the gaming system selects the additional keno numbers 47, 82, and 85 to include in the gaming system keno number set associated with the updated second keno board 210A. As noted above, the gaming system displays an indicator, such as a ball icon, in the keno number position of each keno number included in the gaming system keno number set (not labeled for clarity), though it should be appreciated that the gaming system may indicate the keno numbers included in the gaming system keno number set in any suitable manner. In this example embodiment, the keno number 82 corresponds (e.g., maps) to the second bonus tile of the bonus row 218 (e.g., "10 credits") and the keno number 85 corresponds (e.g., maps) to the fifth bonus tile of the bonus row 218 (e.g., "10 credits").

The gaming system then makes a bonus award determination for the play of the updated second keno board 210A by determining which, if any, of the keno numbers included in the gaming system keno number set associated with the updated second keno board 210A correspond to bonus tiles of the bonus row 218. The gaming system determines, based on the bonus awards associated with the bonus tiles "Hit," any bonus award to provide player for the play of the second keno board. In this example embodiment, the gaming system provides the player 20 credits because of the two "10 credit" bonus tiles that were "Hit."

The gaming system then makes a primary award determination for the play of the updated second keno board 210A by determining how many "Hits" occurred. As noted above, a "Hit" occurs when a keno number in the gaming system keno number set is also included in the player keno number set. In this instance, the gaming system determines that three "Hits" occurred because the keno numbers 23, 53 and 64 are each included in both the player keno number set and the gaming system keno number set, as shown in the hits meter 212. The gaming system indicates when a "Hit" occurs by displaying a "Hit" indicator (not labeled for clarity) in the keno number position of each keno number included in both the player keno number set and the gaming system keno number set, though it should be appreciated that the gaming system may indicates "Hits" in any suitable manner. The gaming system determines based on the paytable 270 that a quantity of three "Hits" is not associated with any award amount and, therefore, does not provide any primary award for the play of the updated second keno board 210A of the keno game. In this example embodiment, for the play of the second keno board, the player is awarded a total credit of 20 credits (e.g., 20 credits bonus awards and 0 credits primary award), as shown in the credit meter 214.

After the gaming system determines any primary award associated with the second keno board 210, the gaming system receives an actuation of the Start button 292 from the player.

Figure 2I:
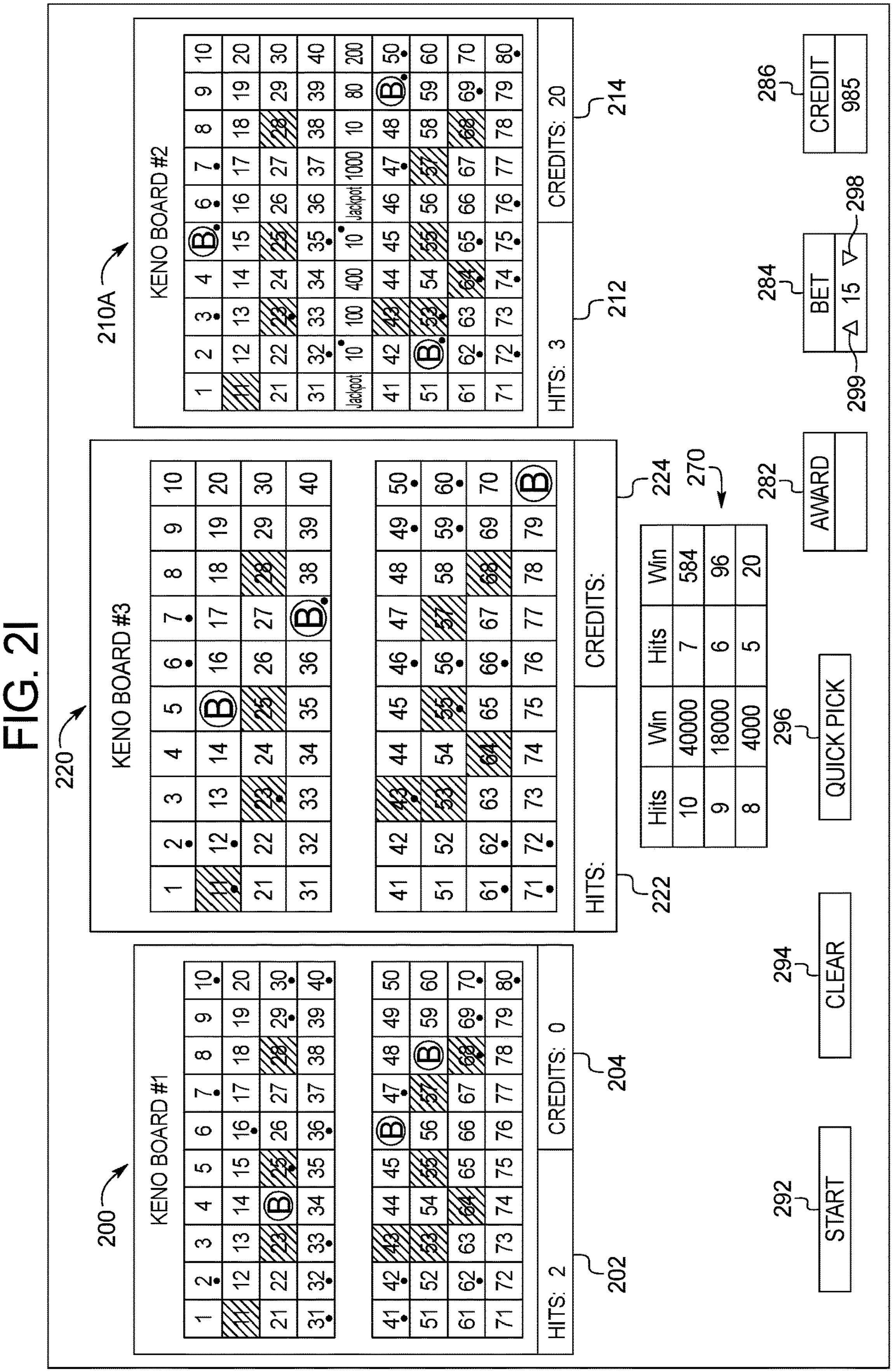

As shown in FIG. 2I, upon receipt of the actuation of the Start button 292, the gaming system selects another keno board (e.g., the third keno board 220) and highlights the selected keno board by displaying the selected keno board as the center keno board of the three keno boards and enlarging the selected board relative to the other two keno boards. The gaming system then begins sequentially selecting the twenty keno numbers to include in the gaming system keno number set associated with the third keno board 210. In this example embodiment, the gaming system selects the keno numbers 2, 6, 7, 11, 12, 23, 37, 43, 46, 49, 50, 55, 56, 59, 60, 61, 62, 66, 71, and 72 to include in the gaming system keno number set associated with the third keno board 220. As noted above, the gaming system displays an indicator (e.g., a ball icon) in the keno number position of each keno number included in the gaming system keno number set associated with the third keno board 220 (not labeled for clarity).

The gaming system makes a bonus determination for the play of the third keno board 220 by determining how many bonus spot "Hits" occurred. As noted above, a bonus spot "Hit" occurs when a keno number in the gaming system keno number set associated with a keno board is also included in the bonus spot keno number set associated with the keno board. In this instance, the gaming system determines that one bonus spot "Hit" occurred because the keno number 37 is included in both the bonus spot keno number set (e.g., the keno numbers 15, 37, and 80) and the gaming system keno number set associated with the third keno board 220.

Figure 2J:
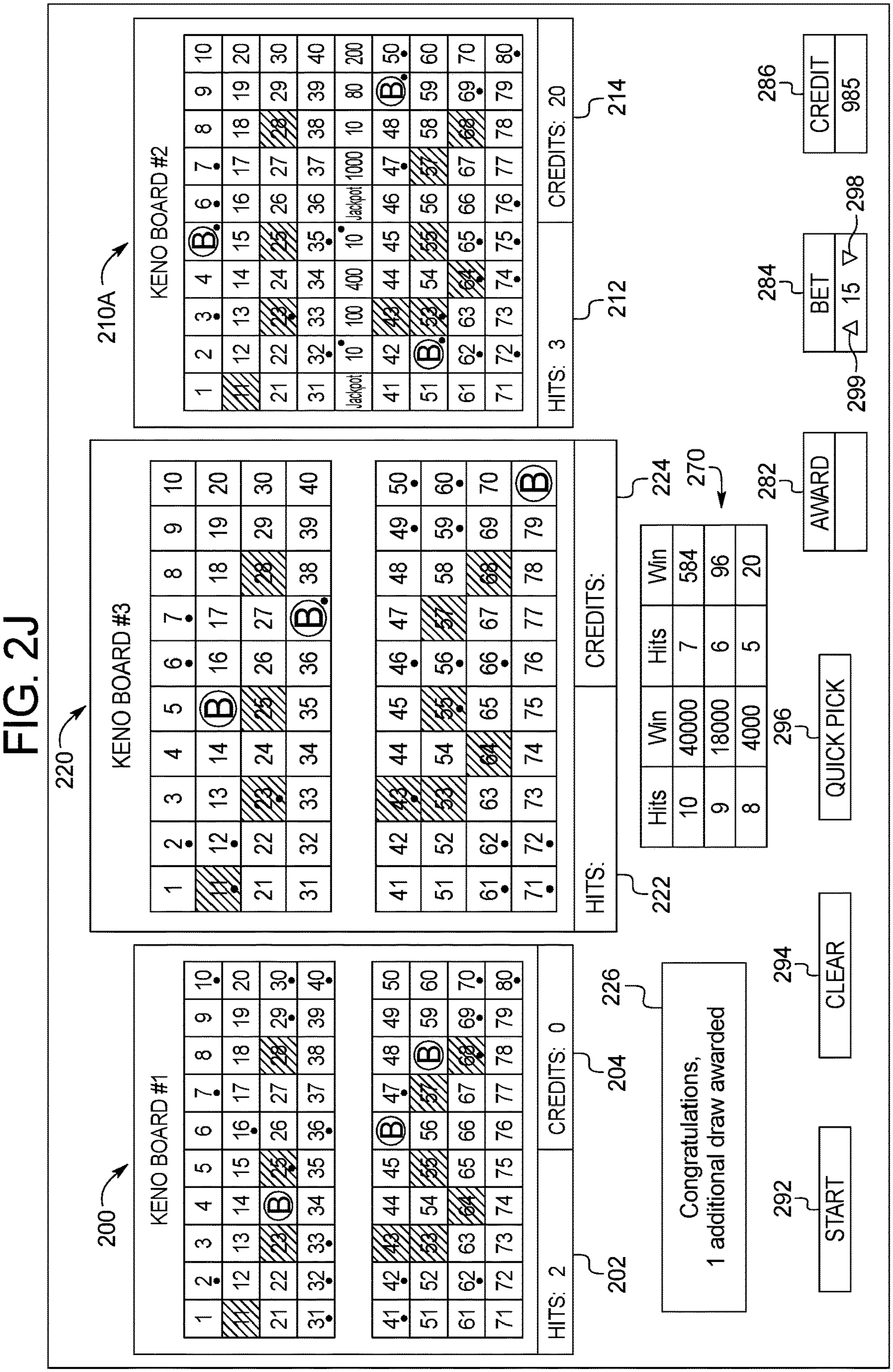

As shown in FIG. 2J, in this example embodiment, the gaming system awards the player a bonus draw for each bonus spot "Hit" that occurred. Accordingly, in this example embodiment, the player is provided one bonus draw for the play of the third keno board 220. In this example embodiment, the gaming system indicates the awarding of the one bonus draw via a text box 226.

Figure 2K:
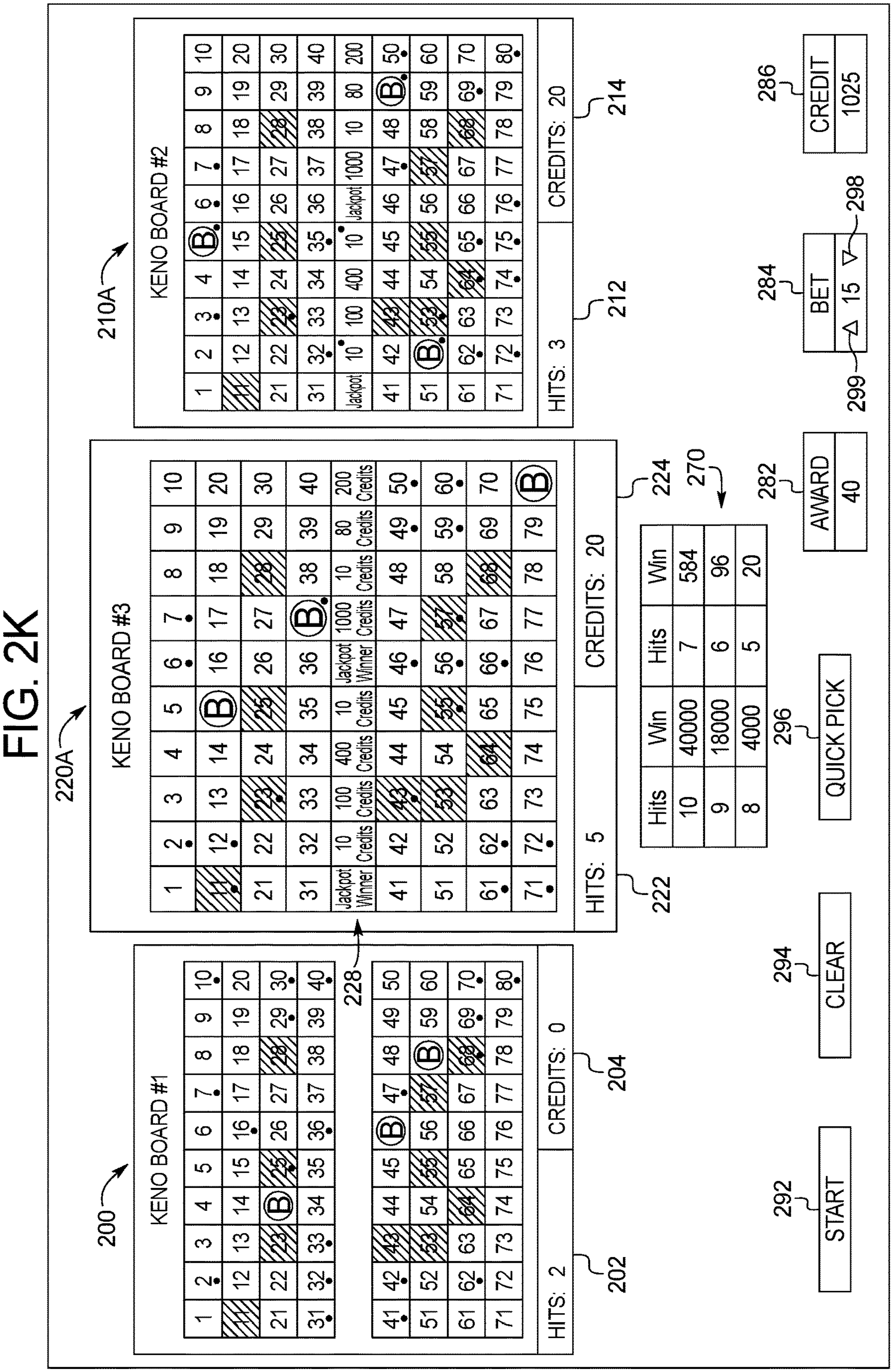

As shown in FIG. 2K, the gaming system then updates the third keno board 220 by adding bonus tiles. In this example embodiment, an updated third keno board 220A includes the keno spots of the initial third keno board 220, including (1) the indicators for the keno number positions associated with the player keno number set, (2) the indicators for the keno number positions associated with the gaming system keno number set, and also includes bonus tiles in a bonus row 228. In this example embodiment, the gaming system also adds bonus keno numbers 81 through 90 to the set of keno numbers associated with the third keno board 220 (e.g., the keno numbers 1 through 80) to form an updated set of keno numbers associated with the updated third keno board 220A (e.g., keno numbers 1 through 90, excluding the keno numbers included in the gaming system keno number set associated with the third keno board 220). In this example embodiment, each of the bonus tiles of the bonus row 228 is associated with a different bonus keno number included in the updated set of keno numbers associated with the updated third keno board 220A. In this example embodiment, each of the bonus tiles of the bonus row 228 provides a bonus award. For example, the first bonus tile of the bonus row 228 ("Jackpot Winner") may correspond (e.g., map) to the bonus keno number 81. In that example, if the gaming system selects the keno number 81 from the updated set of keno numbers associated with the updated third keno board 220A, the gaming system displays an indicator in the first bonus tile of the bonus row 228.

The gaming system then sequentially selects additional keno numbers (e.g., performs the additional draws) from the updated set of keno numbers associated with the third keno number set 220A. In this example embodiment, the gaming system selects the additional keno number 57 to include in the gaming system keno number set associated with the updated third keno board 220A. As noted above, the gaming system displays an indicator, such as a ball icon, in the keno number position of each keno number included in the gaming system keno number set (not labeled for clarity), though it should be appreciated that the gaming system may indicate the keno numbers included in the gaming system keno number set in any suitable manner. In this instance, none of the keno numbers included in the gaming system keno number set correspond to any of the bonus tiles of the bonus row 228.

The gaming system then makes a bonus award determination for the play of the updated third keno board 220A by determining which, if any, of the keno numbers included in the gaming system keno number set associated with the updated third keno board 220A correspond to bonus tiles of the bonus row 228. The gaming system determines, based on the bonus awards associated with the bonus tiles "Hit," any bonus award to provide player for the play of the second keno board. In this example embodiment, the gaming system provides the player 0 bonus credits because none of the bonus credit tiles were "Hit."

The gaming system then makes a primary award determination for the play of the updated third keno board 220A by determining how many "Hits" occurred. As noted above, a "Hit" occurs when a keno number in the gaming system keno number set is also included in the player keno number set. In this instance, the gaming system determines that five "Hits" occurred because the keno numbers 11, 23, 43, 55, and 57 are each included in both the player keno number set and the gaming system keno number set, as shown in the hits meter 222. The gaming system determines based on the paytable 270 that a quantity of five "Hits" is associated with a 20 credits award. In this example embodiment, for the play of the third keno board, the player is awarded a total credit of 20 credits (e.g., 0 bonus credits award and 20 credits primary award), as shown in the credit meter 224.

The gaming system then determines the total credits awarded to the player for the play of the keno game (e.g., the awards provided to the player for each of the three keno boards 200, 210, and 220, as shown in the corresponding credit meters 204, 214, and 224). In this example embodiment, the gaming system sums the credits awarded for each of the three keno boards 200, 210, and 220, and awards the player a total of 40 credits, as shown in the awards meter 282. The gaming system also updates the credit balance of the player by the 40 credits awarded (from 985 credits) to 1025 credits, as shown in the credit meter 286.

3. Variations

In various embodiments, any suitable quantity of bonus icons may be added to a keno board.

In various embodiments, any suitable quantity of bonus draws may be awarded (or provided) to a player for a bonus spot "Hit."

While examples disclosed herein include a multi-play keno game including three keno boards, it should be appreciated that other embodiments may include any suitable quantity of keno boards (e.g., a play of the keno game may include twenty keno boards).

While examples disclosed herein displayed the three keno boards at the same time, it should be appreciated that other embodiments may display any suitable quantity of keno boards at a time. For example, in one embodiment, the gaming system may display one keno board at a time.

While examples disclosed herein iteratively played the keno boards, it should be appreciated that other embodiments may play each of the keno boards simultaneously (e.g., at or about the same time).

In the above example embodiment, the keno numbers selected for the bonus icons were keno numbers not included in the player keno number set. In additional or alternative embodiments, any suitable quantity of the keno numbers selected for the bonus icons may be included in the player keno number set.

In the above example embodiment, the gaming system adds the bonus icons to each of the keno boards 200, 210, and 220 at the same time (e.g., in response to actuation of the Start button 292 by the player). In additional or alternative embodiments, the gaming system may add the bonus icons iteratively for when the respective keno board is being played. For example, when the first keno board 200 is being played, before the gaming system selects the keno numbers to include in the gaming system keno number set associated with the first keno board 200, the gaming system adds bonus icons to the first keno board 200. The gaming system then adds bonus icons to the second keno board 210 before the gaming system selects the keno numbers to include in the gaming system keno number set associated with the second keno board 210. The gaming system then adds bonus icons to the third keno board 220 before the gaming system selects the keno numbers to include in the gaming system keno number set associated with the third keno board 220.

While examples disclosed herein sequentially select the twenty keno numbers to include in the gaming system keno number sets, it should be appreciated that other embodiments may include simultaneously (e.g., at or about the same time) selecting the keno numbers to include in the gaming system keno number sets.

It should be appreciated that:

(a) the keno numbers associated with the keno boards;

(b) the bonus awards; and/or (c) any other variables and determinations described herein may be: (1) predetermined; (2) randomly determined; (3) randomly determined based on one or more weighted percentages (such as according to a weighted table); (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an EGM; (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager or wager level; (17) determined independent of the player's primary game wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; and/or (26) determined in any other suitable manner or based on or independent of any other suitable factor(s).

4. Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (I) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

Figure 3:
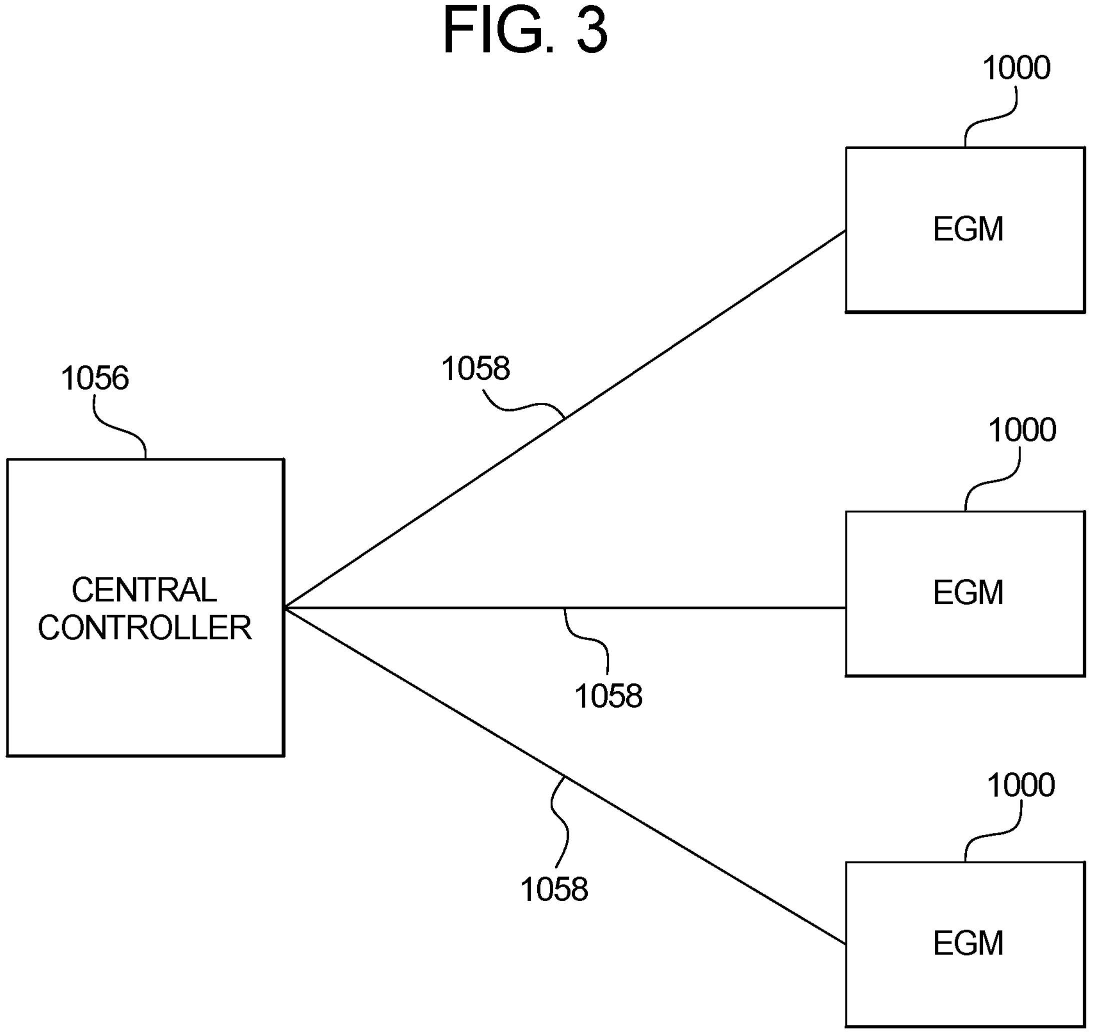
FIG. 3 is a schematic block diagram of one embodiment of a network configuration of the gaming system of the present disclosure.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system illustrated in FIG. 3 includes a plurality of EGMs 1000 that are each configured to communicate with a central server, central controller, or remote host 1056 through a data network 1058.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

5. EGM Components

Figure 4:
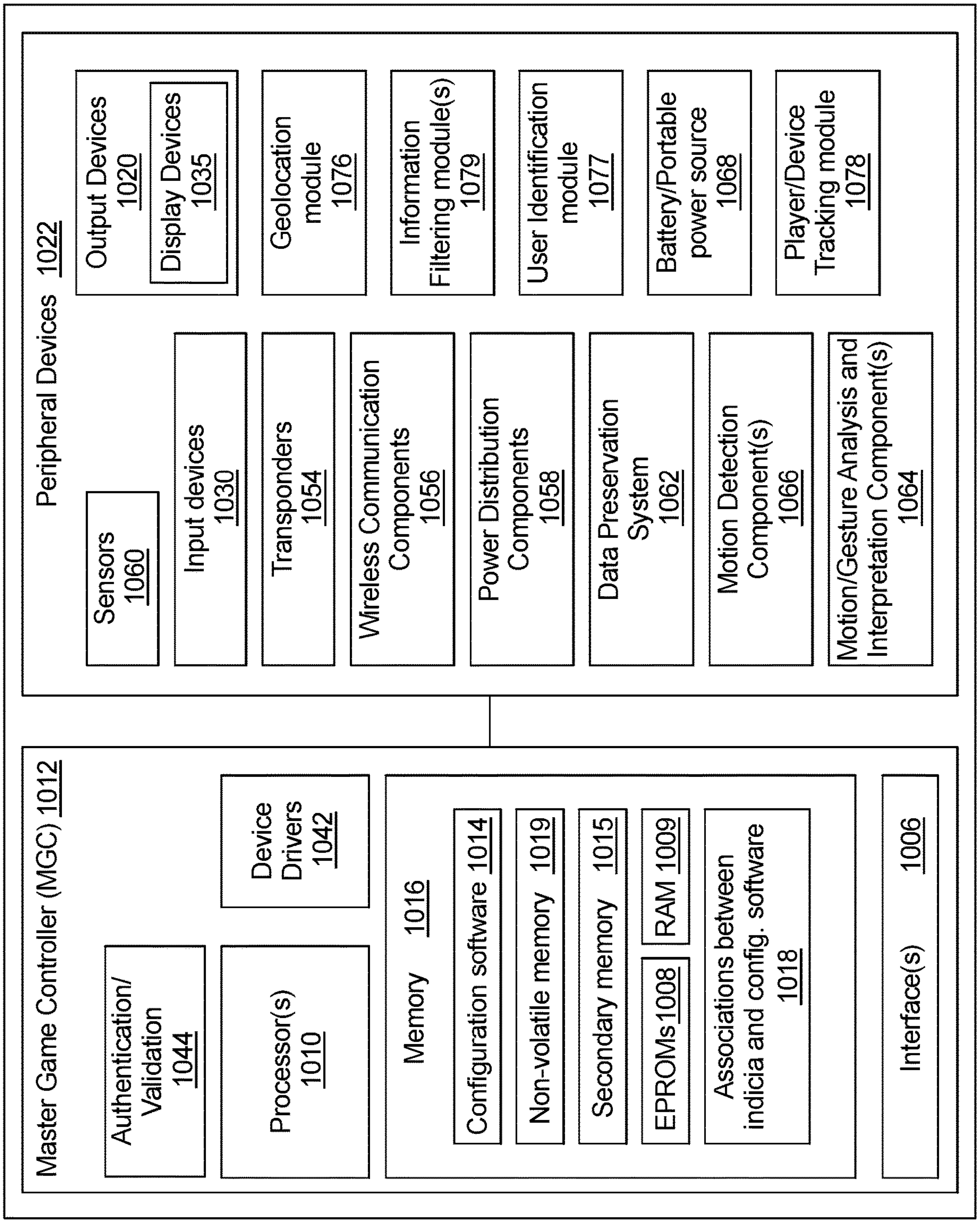
FIG. 4 is a schematic block diagram of an example electronic configuration of the gaming system of the present disclosure.
Figure 5A:
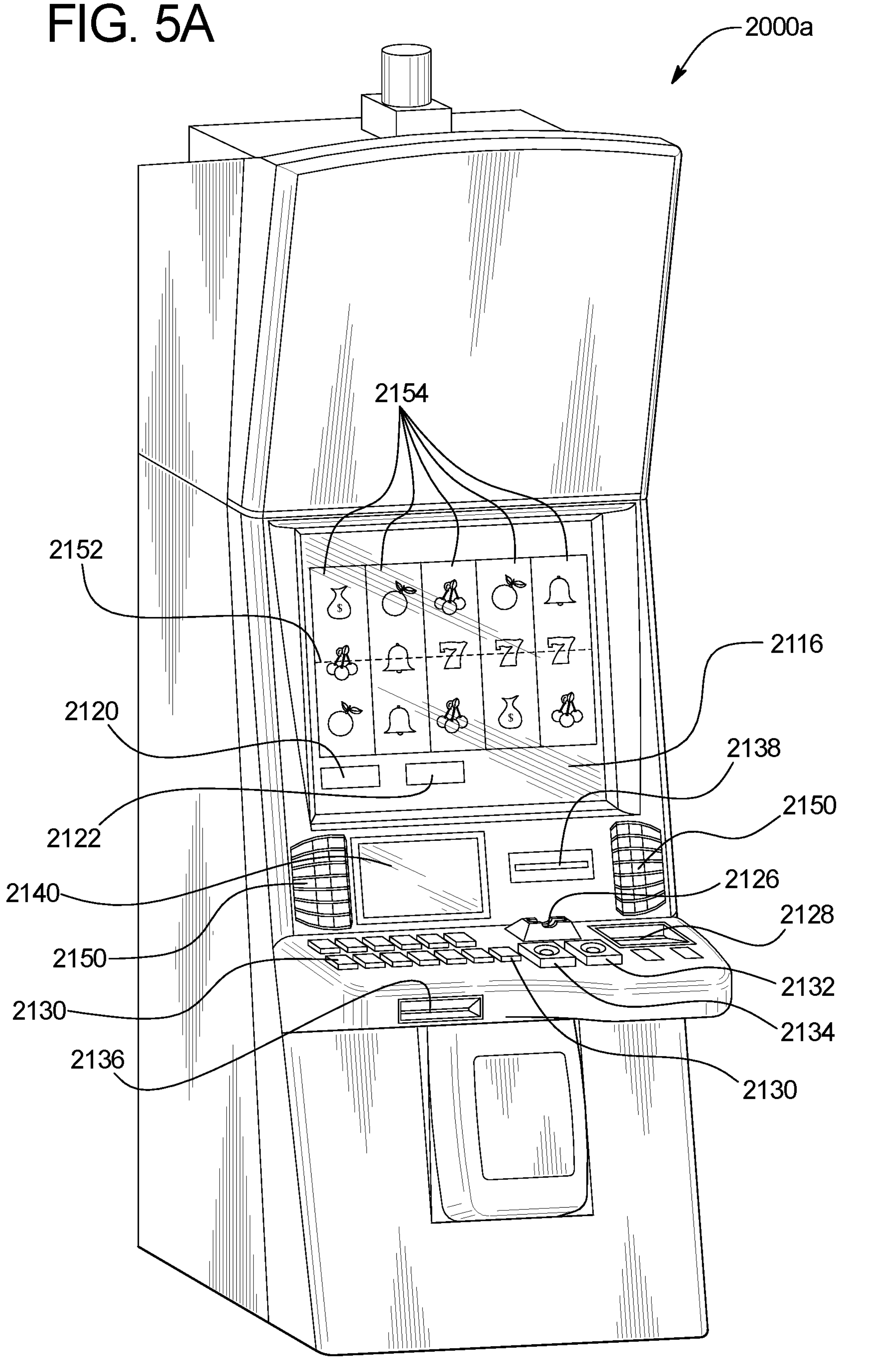
FIGS. 5A and 5B are perspective views of example alternative embodiments of the gaming system of the present disclosure.
Figure 5B:
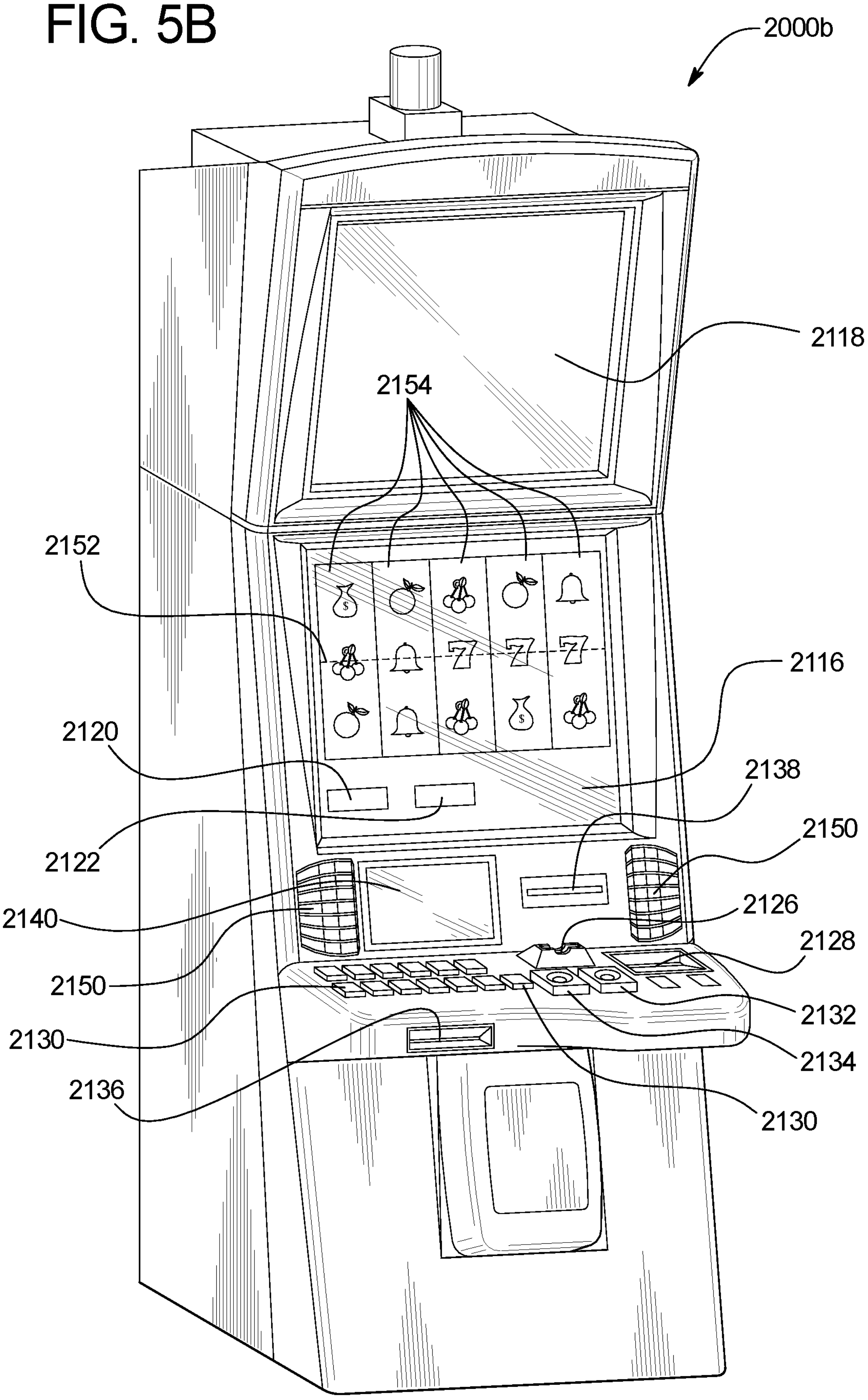
Figure 5C:
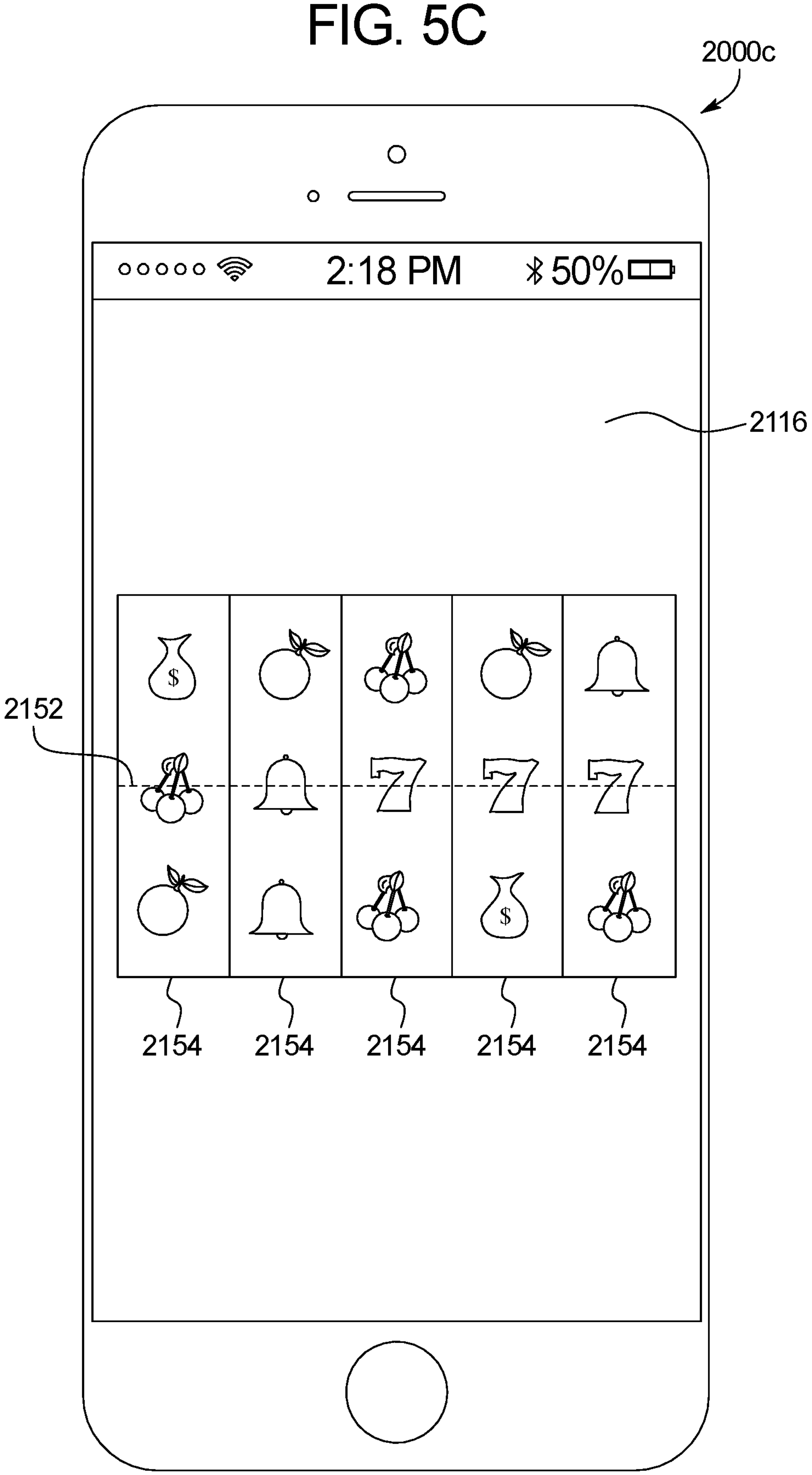
FIG. 5C is a front view of an example personal gaming device of the gaming system disclosed herein.

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 5C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM **2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122**.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

6. Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled “Finite Pool Gaming Method and Apparatus”; U.S. Pat. No. 7,563,163, entitled “Gaming Device Including Outcome Pools for Providing Game Outcomes”; U.S. Pat. No. 7,833,092, entitled “Method and System for Compensating for Player Choice in a Game of Chance”; U.S. Pat. No. 8,070,579, entitled “Bingo System with Downloadable Common Patterns”; and U.S. Pat. No. 8,398,472, entitled “Central Determination Poker Game,” which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled “Using Multiple Bingo Cards to Represent Multiple Slot Paylines and Other Class III Game Options”; U.S. Pat. No. 7,731,581, entitled “Multi-Player Bingo Game with Multiple Alternative Outcome Displays”; U.S. Pat. No. 7,955,170, entitled “Providing Non-Bingo Outcomes for a Bingo Game”; U.S. Pat. No. 8,070,579, entitled “Bingo System with Downloadable Common Patterns”; and U.S. Pat. No. 8,500,538, entitled “Bingo Gaming System and Method for Providing Multiple Outcomes from Single Bingo Pattern,” which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled “Gaming Machine Having a Lottery Game and Capability for Integration with Gaming Device Accounting System and Player Tracking System,” and U.S. Pat. No. 8,597,116, entitled “Virtual Player Tracking and Related Services,” which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 5B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

7. Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity," which is incorporated herein by reference.

8. Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

9. Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a processor; and a memory device including a plurality of instructions that, when executed, cause the processor to at least:
for a play of a keno game:
cause a display device to display a first keno board including a first plurality of keno spots, wherein each keno spot of the first keno board is associated with a different keno number of a set of different keno numbers;
form a player keno number set including one or more keno numbers of the set of different keno numbers;
form a bonus spot keno number set associated with the first keno board, the bonus spot keno number set including one or more keno numbers of the set of different keno numbers;
for each keno number included in the bonus spot keno number set, cause the display device to display a bonus icon at a corresponding keno spot of the first keno board; and
for a play of the first keno board:
form a gaming system keno number set associated with the first keno board, the gaming system keno number set to include a plurality of keno numbers;
determine a quantity of bonus draws for the first keno board based on a comparison of the bonus spot keno number set and the gaming system keno number set;
responsive to a determination that the quantity of bonus draws for the first keno board is greater than zero bonus draws:
cause the display device to display at least one bonus tile with the first keno board;
for each bonus tile displayed with the first keno board, add a bonus keno number to the set of different keno numbers, wherein each of the added bonus keno numbers maps to a different displayed bonus tile;
select a quantity of keno numbers from the set of different keno numbers based on in part the quantity of bonus draws;
add the selected keno numbers to the gaming system keno number set; and
determine any bonus awards based on a comparison of the keno numbers included in the gaming system keno number set and the bonus keno numbers that map to any of the displayed bonus tiles;
determine any primary awards based on a comparison of the player keno number set with the gaming system keno number set associated with the first keno board; and
cause the display device to display any bonus awards and primary awards associated with the first keno board.

2. The gaming system of claim 1, wherein the plurality of instructions, when executed, cause the processor to form the player keno number set by enabling a player to select the one or more keno numbers to include in the player keno number set.

3. The gaming system of claim 1, wherein the plurality of instructions, when executed, cause the processor to form the player keno number set by randomly selecting the one or more keno numbers to include in the player keno number set.

4. The gaming system of claim 1, wherein the plurality of instructions, when executed, cause the processor to determine the quantity of bonus draws for the first keno board by comparing keno numbers included in the bonus spot keno number set to keno numbers included in the gaming system keno number set.

5. The gaming system of claim 4, wherein the plurality of instructions, when executed, cause the processor to provide a bonus draw for each keno number that is included in the bonus spot keno number set and the gaming system keno number set.

6. The gaming system of claim 1, wherein each bonus tile is associated with a different bonus award.

7. The gaming system of claim 1, wherein the plurality of instructions, when executed, cause the processor to determine any primary awards by comparing a quantity of hits that occurred on the play of the first keno board to a paytable.

8. The gaming system of claim 1, wherein the play of the keno game includes a play of a second keno board.

9. The gaming system of claim 8, wherein the player keno number set is the same for the play of the first keno board and the play of the second keno board.

10. The gaming system of claim 8, wherein the plurality of instructions, when executed, cause the processor to determine any total awards for the play of the keno game based on (1) any bonus awards associated with the first keno board, (2) any primary awards associated with the first keno board, (3) any bonus awards associated with the second keno board, and (4) any primary awards associated with the second keno board.

11. A method of operating a gaming system, the method comprising:
for a play of a keno game:
causing, by a processor, a display device to display a first keno board including a first plurality of keno spots, wherein each keno spot of the first keno board is associated with a different keno number of a set of different keno numbers;
forming, by the processor, a player keno number set including one or more keno numbers of the set of different keno numbers;
forming, by the processor, a bonus spot keno number set associated with the first keno board, the bonus spot keno number set including one or more keno numbers of the set of different keno numbers;
for each keno number included in the bonus spot keno number set, causing, by the processor, the display device to display a bonus icon at a corresponding keno spot of the first keno board; and
for a play of the first keno board:
forming, by the processor, a gaming system keno number set associated with the first keno board, the gaming system keno number set to include a plurality of keno numbers;
determining, by the processor, a quantity of bonus draws for the first keno board based on a comparison of the bonus spot keno number set and the gaming system keno number set;
in response to a determination that the quantity of bonus draws for the first keno board is greater than zero bonus draws:
causing, by the processor, the display device to display at least one bonus tile with the first keno board;
for each bonus tile displayed with the first keno board, adding, by the processor, a bonus keno number to the set of different keno numbers, wherein each of the added bonus keno numbers maps to a different displayed bonus tile;

selecting, by the processor, a quantity of keno numbers from the set of different keno numbers based on in part the quantity of bonus draws;

adding, by the processor, the selected keno numbers to the gaming system keno number set; and determining, by the processor, any bonus awards based on a comparison of the keno numbers included in the gaming system keno number set and the bonus keno numbers that map to any of the displayed bonus tiles;

determining, by the processor, any primary awards based on a comparison of the player keno number set with the gaming system keno number set associated with the first keno board; and causing, by the processor, the display device to display any bonus awards and primary awards associated with the first keno board.

12. The method of claim 11, wherein the forming of the player keno number set includes enabling a player to select the one or more keno numbers to include in the player keno number set.

13. The method of claim 11, wherein the forming of the player keno number set includes randomly selecting the one or more keno numbers to include in the player keno number set.

14. The method of claim 11, wherein the determining of the quantity of bonus draws for the first keno board includes comparing keno numbers included in the bonus spot keno number set to keno numbers included in the gaming system keno number set.

15. The method of claim 14, which includes providing a bonus draw for each keno number that is included in the bonus spot keno number set and the gaming system keno number set.

16. The method of claim 11, wherein each bonus tile is associated with a different bonus award.

17. The method of claim 11, wherein the determining of the any primary awards includes comparing a quantity of hits that occurred on the play of the first keno board to a paytable.

18. The method of claim 11, wherein the play of the keno game includes a play of a second keno board.

19. The method of claim 18, wherein the player keno number set is the same for the play of the first keno board and the play of the second keno board.

20. The method of claim 18, which includes determining any total awards for the play of the keno game based on (1) any bonus awards associated with the first keno board, (2) any primary awards associated with the first keno board, (3) any bonus awards associated with the second keno board, and (4) any primary awards associated with the second keno board.

* * * * *